United States Patent [19]

Easley et al.

[11] 4,287,559
[45] Sep. 1, 1981

[54] ELECTRONIC MICROPROCESSOR SYSTEM HAVING TWO CYCLE BRANCH LOGIC

[75] Inventors: Steven J. Easley, Houston; George L. Brantingham, Richardson, both of Tex.

[73] Assignee: Texas Instruments Incorporated, Dallas, Tex.

[21] Appl. No.: 970,080

[22] Filed: Dec. 15, 1978

Related U.S. Application Data

[63] Continuation of Ser. No. 766,998, Feb. 9, 1977, abandoned.

[51] Int. Cl.³ .............................................. G06F 9/26
[52] U.S. Cl. .................................... 364/200; 364/900
[58] Field of Search ... 364/200 MS File, 900 MS File, 364/712

[56] References Cited

U.S. PATENT DOCUMENTS

| | | | |
|---|---|---|---|
| 3,018,956 | 1/1962 | Hosier et al. | 364/200 |
| 3,551,895 | 12/1970 | Driscoll, Jr. | 364/200 |
| 3,670,308 | 6/1972 | Tutelman | 364/900 |
| 3,764,988 | 10/1973 | Omishi | 364/200 |
| 3,922,538 | 11/1975 | Cochran et al. | 364/712 |
| 4,021,656 | 5/1977 | Caudel et al. | 364/900 |
| 4,075,687 | 2/1978 | Nissen et al. | 364/200 |
| 4,100,606 | 7/1978 | Brantingham | 364/900 |
| 4,112,495 | 9/1978 | Easly | 364/700 |

Primary Examiner—Harvey E. Springborn
Attorney, Agent, or Firm—Robert D. Marshall, Jr.; Leo N. Heiting; Melvin Sharp

[57] ABSTRACT

An integrated chip microprocessor system has a data memory for storing numeric data, an arithmetic unit for performing arithmetic operations on such data, an instruction memory for storing a plurality of instruction words, a program counter for addressing the instruction memory, and an instruction word decoder for decoding instruction words outputted from the instruction memory for controlling the operation of the microprocessor system. The instruction word decoder has a branch decoder system for implementing a two cycle branch logic. Each program branch operation, as stored in the instruction memory has two parts: a branch instruction word which indicates a program branch and also indicates the state of a selected one of a plurality of flag latches upon which it is conditioned; and a branch address instruction word solely indicative of the instruction memory address to which the program is to branch, the branch address instruction word being stored in the next memory location in the instruction memory following the branch instruction word. The branch decoder system determines when a branch instruction word is outputted from the instruction memory and also determines if the program branch is conditional or unconditional, and if the branch is conditional, the particular state of a selected flag latch upon which the branch is conditioned. If the branch is unconditioned, or if the branch is conditional and the condition satisfied, the branch decoder system inserts the branch address instruction word which is the next instruction word outputted from the instruction memory into the program counter.

8 Claims, 40 Drawing Figures

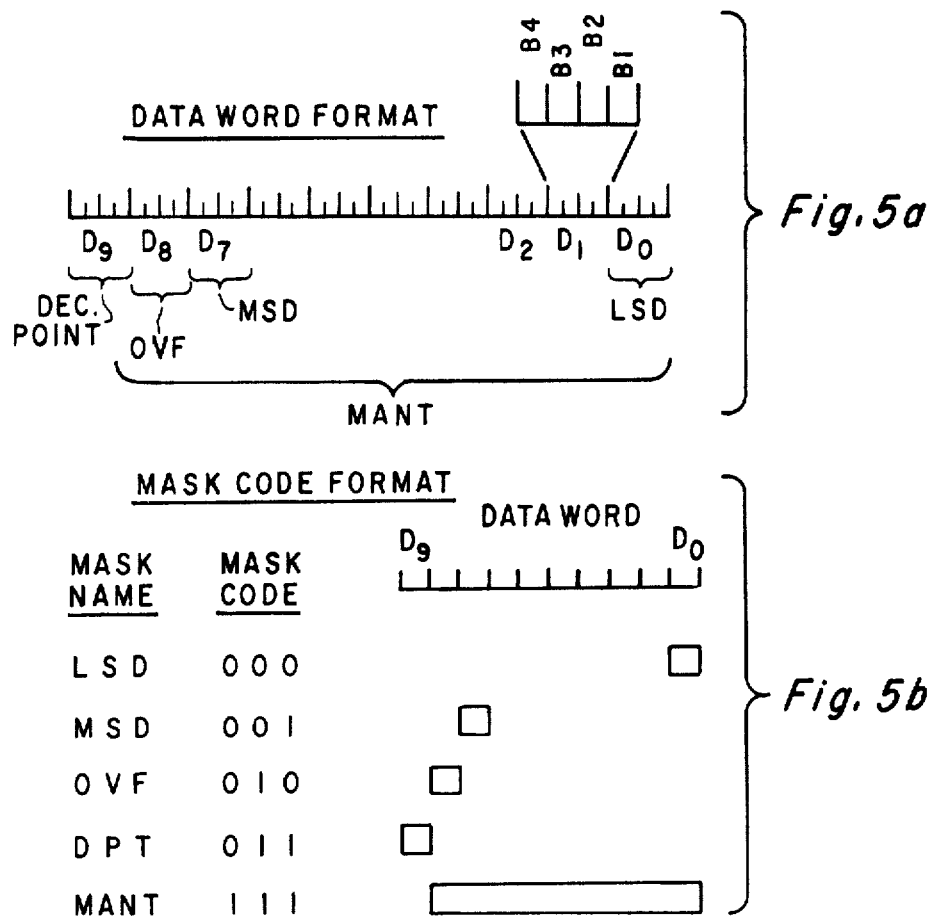

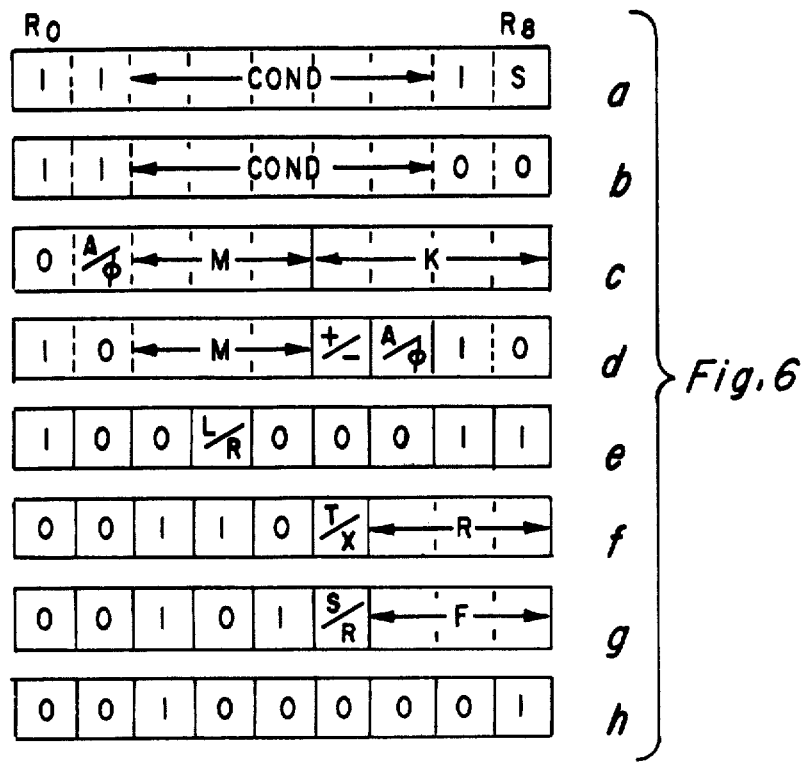
Fig. 6
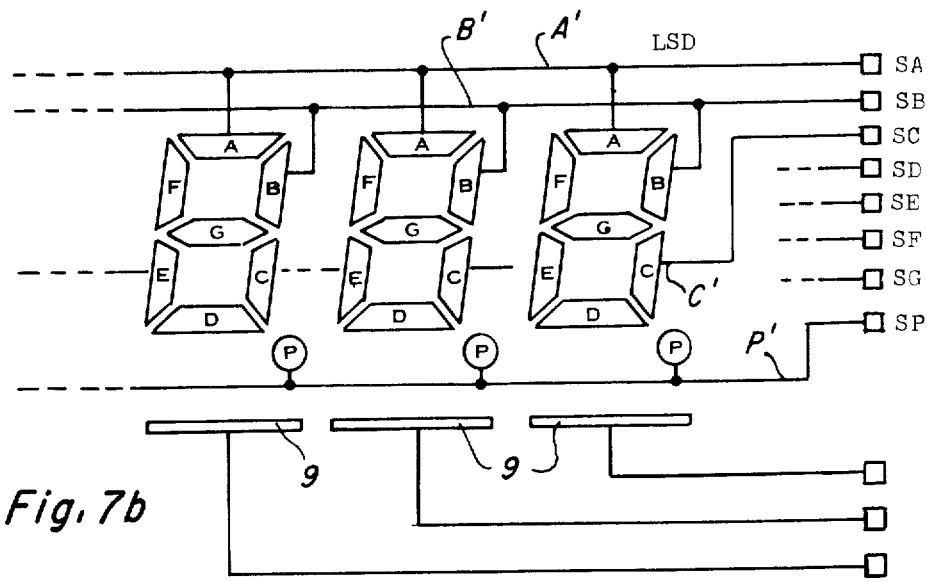
Fig. 7a
Fig. 7b

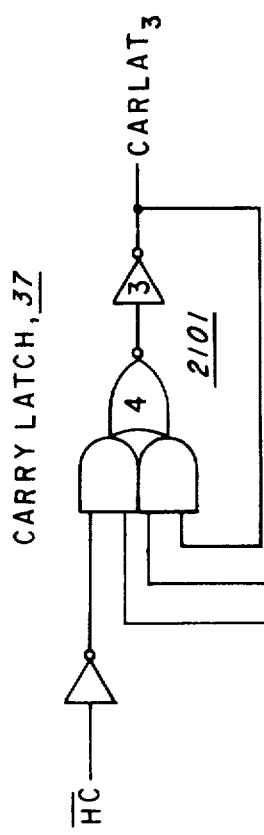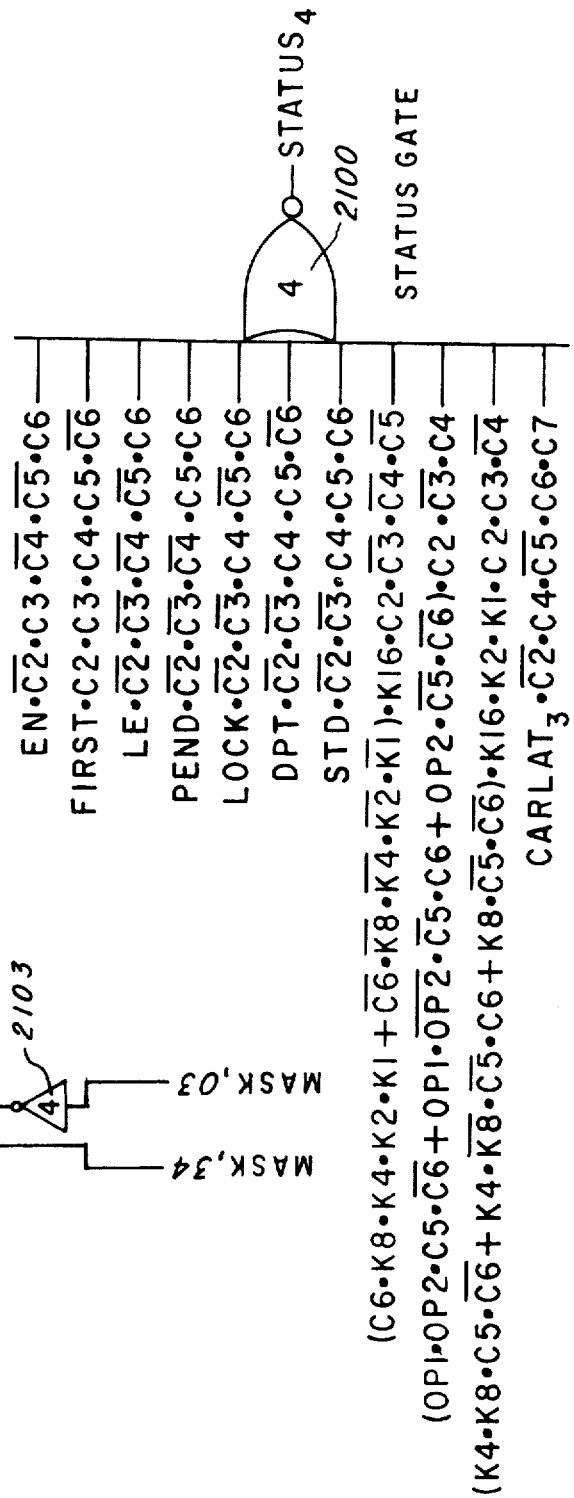
Fig. 21

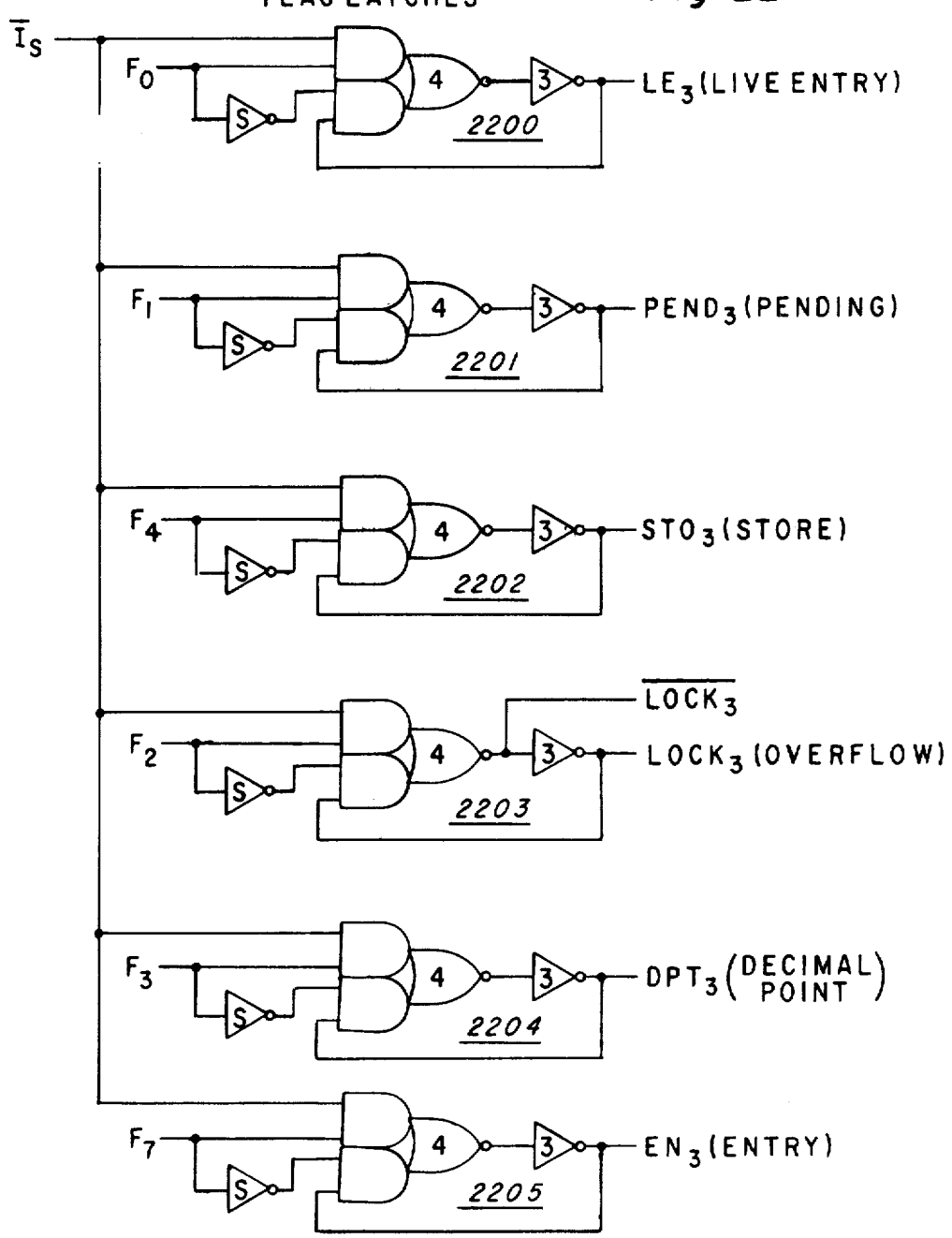

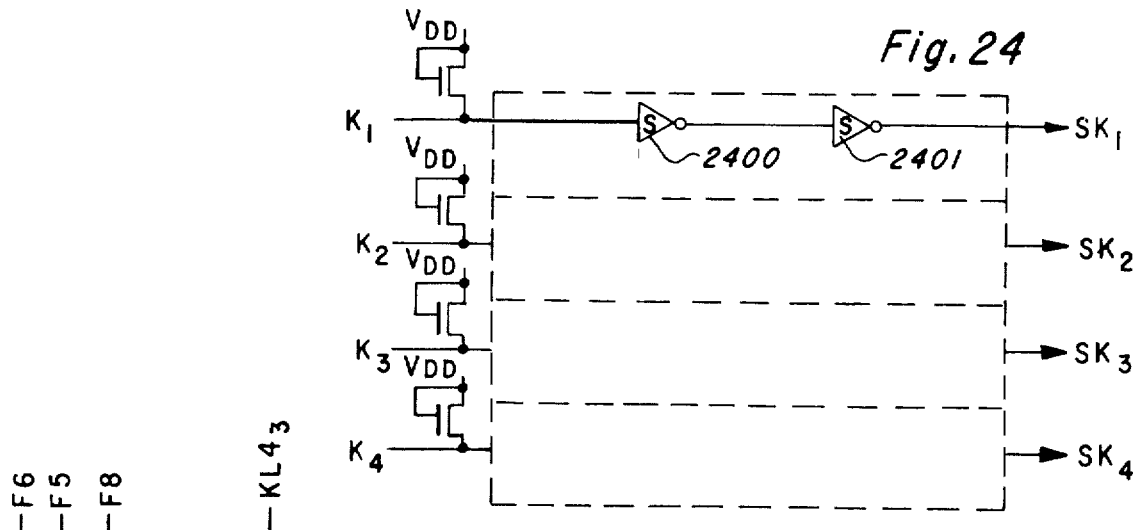
Fig. 24
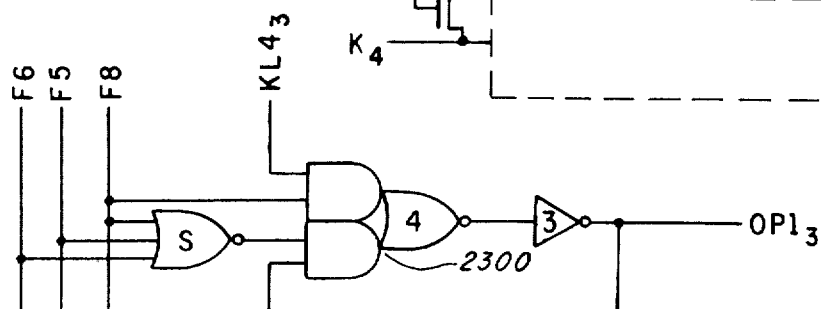
OPERATION FLAGS, 38
Fig. 23
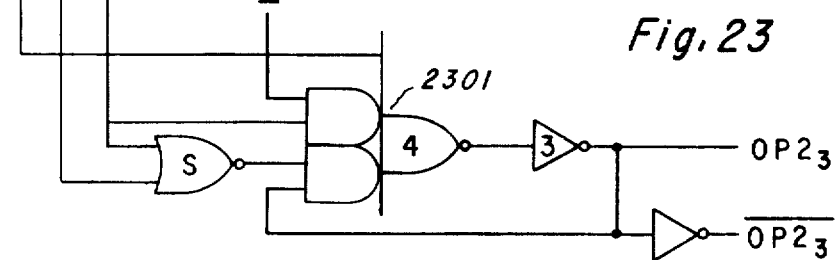
Fig. 27
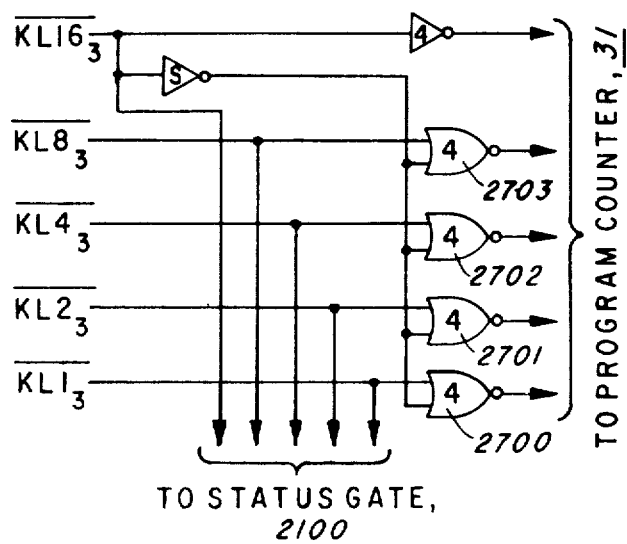
TO STATUS GATE, 2100

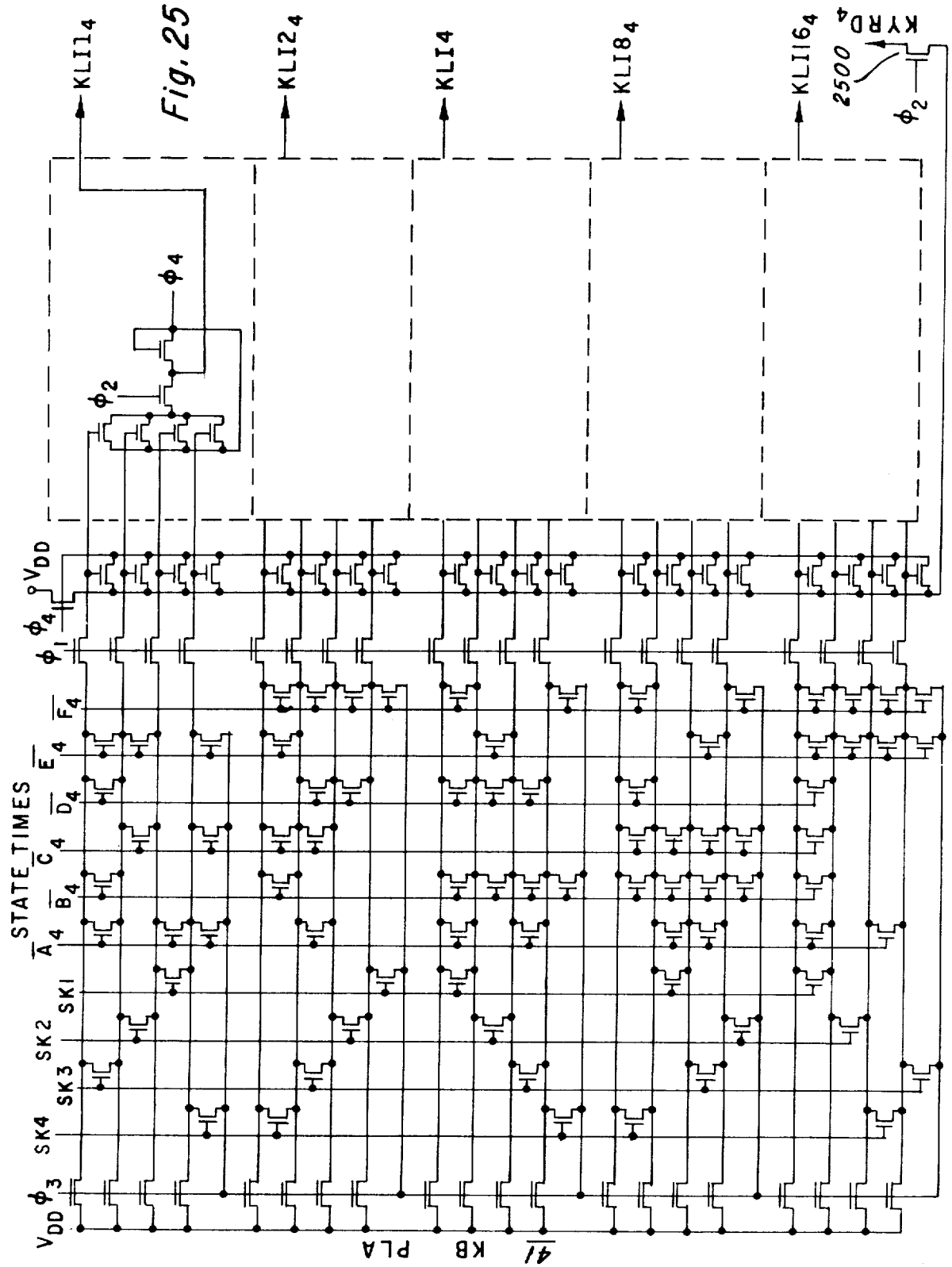

ELECTRONIC MICROPROCESSOR SYSTEM HAVING TWO CYCLE BRANCH LOGIC

This is a continuation of application Ser. No. 766,998, filed Feb. 9, 1977, now abandoned. This application discloses subject matter related to the subject matter taught in U.S. Pat. No. 4,100,060 and 4,112,495.

BACKGROUND OF THE INVENTION

Electronic microprocessor systems of the type wherein all the main electronic functions are integrated on a single integrated semiconductor chip wherein a small number of such chips are described in the following U.S. Patents, which are assigned to the assignee of this invention:

U.S. Pat. No. 3,919,532 issued to Michael J. Cochran and Charles P. Grant on Nov. 11, 1975 and entitled "Calculator System Having An Exchange Data Memory Register", U.S. Pat. No. 3,934,233 issued to Roger J. Fisher and Jerald D. Rogers on Jan. 20, 1976 and entitled "Read-Only-Memory for Electronic Calculator", U.S. Pat. No. 3,931,507 issued to George L. Brantingham on Jan. 6, 1976 and entitled "Power-Up Clear in Electronic Digital Calculator", U.S. Pat. No. 3,988,604 issued to Joseph H. Raymond, Jr. on Oct. 26, 1976 and entitled "Electronic Calculator of Digital Processor Chip Having Multiple Function Arithmetic Unit Output".

The concepts of these prior applications have made possible vast reductions in the cost of the small personal-sized calculators. Continuing efforts to reduce the cost of these products include the development of a microprocessor chip utilizing minimum semiconductor chip area and which is capable of performing addition, subtraction, multiplication, division, squaring, square rooting, percent and memory operations. The chip disclosed herein may be utilized in hand-held or desk model calculators capable of performing operations of the aforementioned types and may be implemented on a very small semiconductor chip.

The present invention relates to a branch decoder system for a microprocessor and more specifically a branch decoder system for a microprocessor in an electronc calculator. An entire electronc calculator system which utilizes the branch decoder system of this invention is disclosed. The electronic calculator disclosed is a serial, word organized calculator; however, the invention is not limited to this type calculator, but rather may be utilized in microprocessors generally.

In the prior art, it has been known to use a single instruction branch operation, such as that disclosed in U.S. Pat. No. 3,931,507, where the entire branch address is incorporated as part of the branch instruction word. In that case, the instruction word must be longer than the branch address which, for reasons which will be explained, may result in uneconomic use of chip silicon area. Also, it has been known to use a relative addressing technique, such as that disclosed in U.S. Pat. No. 3,919,532; however, in that case, a branch can only be accomplished within a portion of that read-only-memory (ROM) by the execution of one branch instruction. Also, in the prior art, as exemplified by U.S. Pat. No. 3,988,604, it is been known to use both a program counter and a page address register to address a read-only-memory, the address in the program counter being changed by a branch instruction and the ROM page address being altered by a separate instruction. This technique, however, complicates the branch decoder logic.

It has been found that placing the branch address in the branch instruction word may make uneconomic use of the silicon area for implementing the microprocessor because the instruction word must be two or more bits longer than the instruction word address. For example, consider a ROM having provisions for storing 512 instruction words which uses a program counter having nine bit locations. Since it usually takes two or three additional bits to identify an instruction word as a branch instruction word and to provide for conditional branches, the outputted instruction word must have eleven or twelve bits. However, in relatively simple calculators, an eleven or twelve bit instruction word is longer than is required to decode the set of possible instructions. In the disclosed microprocessor system, a full set of instructions, including branch instructions, is decodeable using only a 9 bit instruction word. The branch system disclosed in U.S. Pat. Nos. 3,919,532 and 3,988,604 has certain disadvantages, in particular the instruction words of the branch system disclosed in these patents contain more than 9 bits and cannot be loaded directly into the program counter. This inability to load instruction words directly into the program counter complicates branching to all locations of the instruction memory. Further, these prior art systems may perform conditional branches but the condition tested is merely the state of a single preselected latch.

It was therefore one object of this invention to provide a branch logic system permitting more efficient use of chip silicon area in the instruction memory.

It is yet another object of this invention to provide a branch logic system wherein conditional branches may be made based on a state of a selected one of a plurality of latches.

It is still another object of this invention to provide an improved branch logic system for a microprocess or in an electronic calculator.

It is another object of this invention to equip an electronic microprocessor with a two cycle branch system.

The foregoing objects are achieved according to the present invention as is now described. In a preferred embodiment of the invention, a branch logic system is provided on a semiconductor chip as part of an electronic calculator. The branch logic system includes branch decoder logic for decoding a branch instruction outputted from the system's instruction word memory during a given timing cycle and a circuit for altering the contents of the program counter addressing the instruction memory according to the instruction outputted from the instruction word memory during a timing cycle immediately following the given timing cycle. Further, the branch decoder logic is preferably responsive to a plurality of bits in the branch instruction word for conditioning the execution of the branch upon the state of a selected flag latch, the flag latch being selected according to the decoding of the aforementioned plurality of bits. Further, in a preferred embodiment, the number of bits in the instruction word outputted from the instruction memory equals the number of bits in the program counter used to address the instruction memory.

BRIEF DESCRIPTION OF THE DRAWINGS

The novel features believed characteristic of the invention are set forth in the appended claims. The invenion itself, however, as well as the preferred mode of use, further objects and advantages thereof, will best be understood by reference to the following detailed description of an illustrative embodiment when read in conjunction with the accompanying drawings, wherein:

FIGS. 5a and 5b depict the form of the data words stored in the data memory registers of the microprocessor system, the mask codes which are used in the instruction words implemented in the read-only-memory, and how these various masks relate to the data words;

FIGS. 6a–6h depict the form of the various instructions words described in Table I;

FIGS. 7a and 7b depict a segmented display and a manner in which the microprocessor system may be interconnected therewith;

FIG. 21 is a logic diagram of the carry latch and a portion of the calculator's branch logic;

FIGS. 22 and 23 are logic diagrams of the calculator's flag latches;

FIG. 24 is a logic diagram of the keyboard buffers;

FIG. 25 is a logic diagram of the keyboard programmed logic array;

FIG. 27 is a logic diagram of the key latch to program counter insertion logic.

DESCRIPTION OF PREFERRED EMBODIMENT

Figure 1:
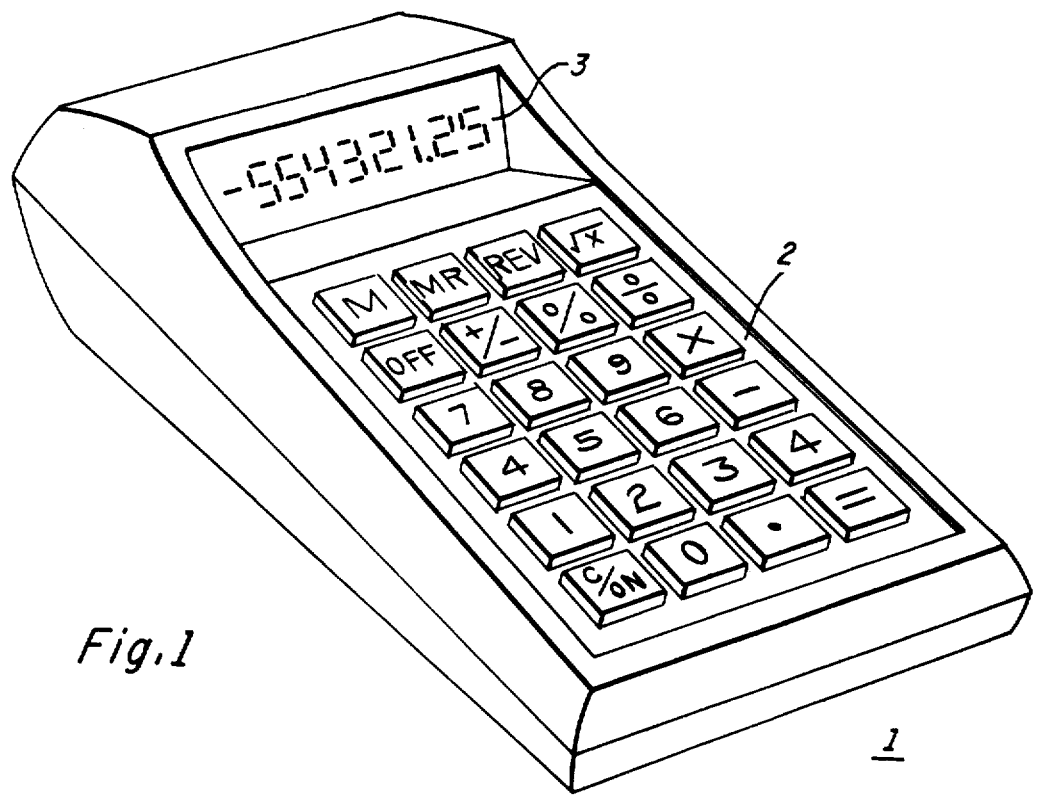
FIG. 1 is a pictorial view of a portable, electronic, hand-held calculator of the type which may embody the present invention.

Referring now to FIG. 1, an electronic portable calculator of the type which may employ features of this invention as shown in pictorial form. The calculator 1 includes a keyboard 2 and a display 3. The display, in one embodiment, consists of eight digits or characters, provided by an array of light emitting diodes, a fluorescent tube, liquid crystal devices or other display means. Each of the characters in the display is preferably implemented as a conventional segmented character, seven segments preferably being provided for character with an additional segment being provided adjacent to each character for displaying a decimal point. The keyboard 2 or other such input means preferably includes a set of numbers keys (0–9), a decimal point key (.), and a plurality of function keys including, for example, addition (+), subtraction (−), division (÷), multiplication (×), square root ($\sqrt{\,}$), clear (c), and square ($x^2$) keys. Further, keys may be provided for memory functions, including such keys as memory operations (M) and memory recall (MR).

Figure 2:
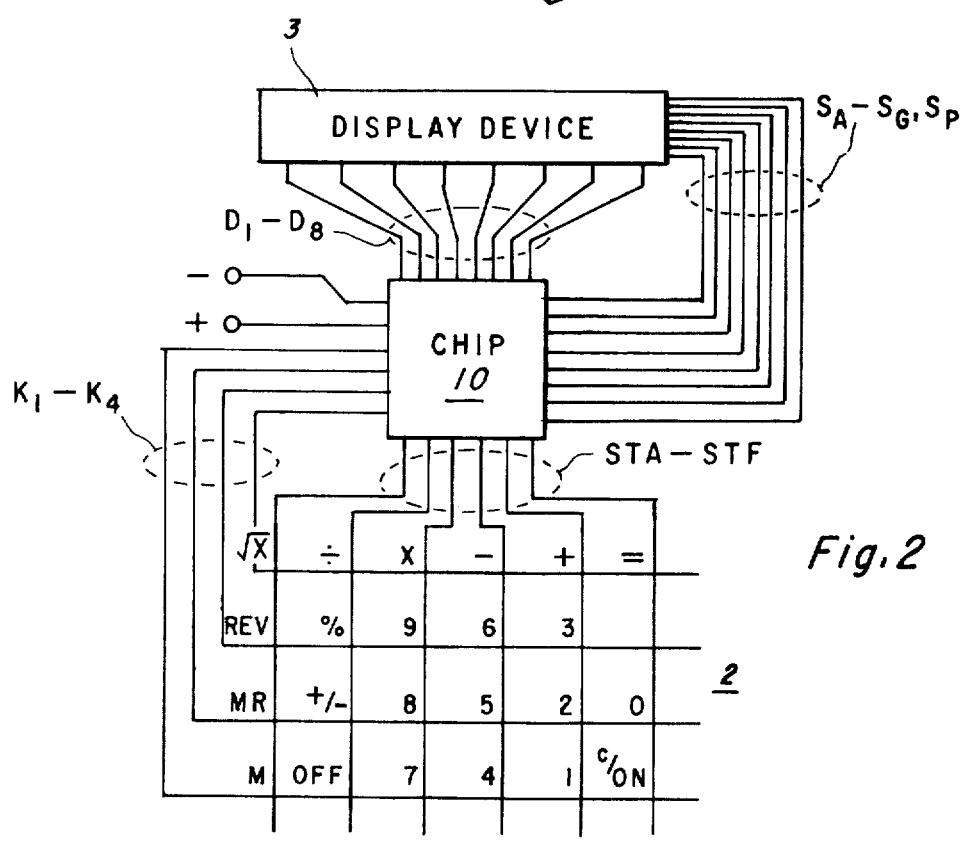
FIG. 2 is a functional schematic diagram of a single chip calculator system of the type which may embody the present invention.

Referring now to FIG. 2, there is shown a functional schematic diagram of a single chip calculator system of the type which may embody the present invention. The single chip 10 shown here is disposed in a twenty-eight pin package. Of course, techniques are known for reducing the number of such pins, for instance by combining the lines for scanning a display and the lines for scanning the keyboard, as taught in U.S. Pat. No. 3,984,816, which is assigned to the assignee of this invention. However, it has been found the design of the circuit board of substrate to which microprocessor chip 10 is affixed may be simplified if the circuit pattern implemented thereon does not have any cross-over points. If cross-over points are required, then the circuit board or substrate must be equipped with jumper wires, double layered wiring or multi-level wiring, all of which complicate the manufacture of the circuit board or substrate. As can be seen from FIG. 2, by using a twenty-eight pin package for chip 10 the need for such cross-over points is avoided. Keyboard 2 may be implemented avoiding such cross-over points in the manner disclosed in U.S. Pat. No. 3,911,234, for instance.

Figure 3:
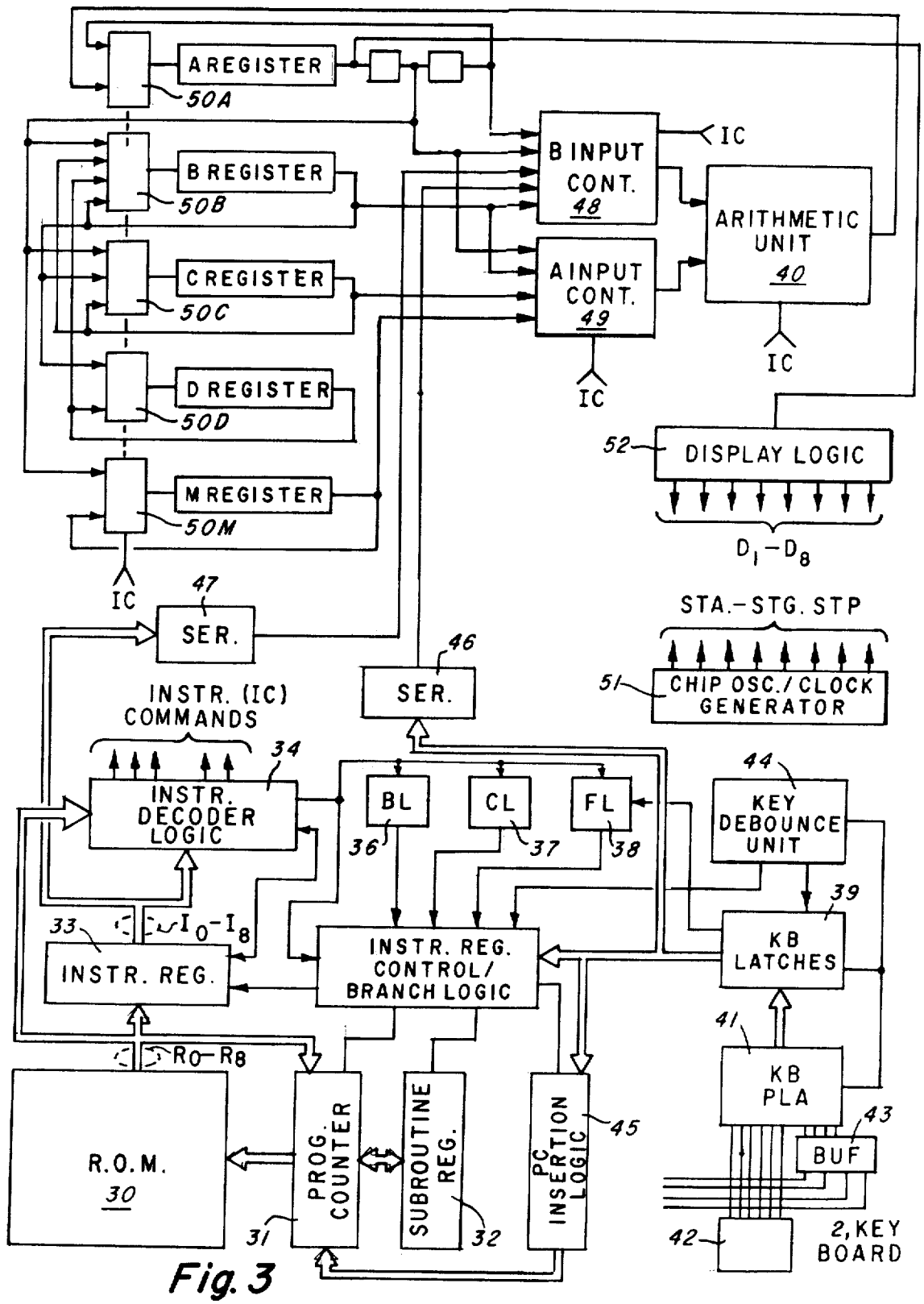
FIG. 3 depicts a functional block diagram of a single chip microprocessor calculator system in a system embodying the present invention.

Referring now to FIG. 3, there is shown a functional block diagram of the single chip microprocessor system embodying the present invention showing the various circuits implemented on chip 10. While a detailed description of the various circuits will be subsequently given with regard to FIGS. 8–29, a general functional description of the basic system is set forth here with regard to FIG. 3. It is to be understood that with regard to the block diagram in FIG. 3, a connection represented by a single line may represent a plurality of actual hardware interconnections and for ease and simplicity of illustration, a single line may represent a plurality of different functions. Extra width lines, such as that between ROM 30 and instruction register 33, are used to denote parallel data paths used in this embodiment of the present invention. While the micropressor's registers (A-D, M) and arithmetic unit 40 operate serially, it is to be understood that many features of this microprocessor are not limited to the use of either parallel or serial data paths unless so set forth in the appended claims.

The microprocessor system of the invention includes an instruction word memory, preferably an instruction word read-only-memory (ROM 30). ROM 30 is responsive to a nine bit address ($PC_0$–$PC_8$), stored in a program counter 31 and produces, in response thereto, a nine bit instruction word ($R_0$–$R_8$), which is provided to an instruction word decoder logic 34 and to an instruction word register 33. Program counter 31 normally increments in a pseudorandom fashion and addresses ROM 30. The instruction word ($I_0$–$I_8$) loaded in the instruction register 33 corresponds to the instruction word ($R_0$–$R_8$) outputted from ROM 30 except that instruction words corresponding to branch, call, return or done instructions are not loaded into instruction register 33. Instead of receiving a branch, call, return or done instruction word, a no-operation (NO-OP) instruction is loaded therein, by the action of instruction register control/branch logic 35. As will be seen, those portions of instruction word decoder logic 34 decoding BRANCH, CALL, DONE, or RETURN instructions are responsive to the $R_0$–$R_8$ instruction word from ROM 30 while other portions of logic 34 are responsive to the $I_0$–$I_8$ instruction word from instruction word register 33. Further, the instruction word following a branch or call instruction word, which corresponds to the address of the branch location, is also inhibited from entering the instruction register 33 when branch latch 36 is set.

The branch address instruction word which follows branch instruction word is loaded into program counter 31 as the branch address when either (1) the branch instruction is an unconditional branch instruction or (2) the branch instruction is a conditional branch instruction and the condition has been satisfied. Instruction register control/branch logic 35 tests the state of a selected flag latch 38, a carry latch 37, a "first" latcn 2600 (FIG. 26) or a combination of selected keyboard latches 39 when a conditional branch instruction is encountered. In section A of Table I, the various branch instructions are listed, indicating the various flags and latches upon which a branch can be conditioned. Since the instruction words preferably have nine digits, the branch address instruction word is directly inserted into program counter 31 when a branch or call is executed.

Branch latch 36 is set by either the decoding of a BRANCH instruction or a CALL instruction (See Sections A and B of Table I) and is used to inhibit the branch address instruction word from being loaded into instruction register 33 or being decoded by those portions of instruction word decoder logic 34 which are responsive to the R0–R8 instruction word. A CALL instruction is a specialized type of unconditional branch instruction in as much as the next instruction word is utilized as the branch address loaded into program counter 31; additionally however, the address to which program counter 31 would have normally incremented is stored in the subrouting register 32. Upon encountering a RETURN instruction, the contents of subroutine register 32 is loaded into program counter 31 under control of instruction register control/branch logic 35. The DONE instruction is an important feature of this microprocessor system which inhibits incrementing of the address stored in program couner 31. Further, the DONE instruction is not loaded into instruction register 33, but rather the contents of instruction register 33 is automatically zeroed which corresponds to a no-operation (NO-OP) instruction. The key latches 39 which provide a key memory means for storing a five bit code, are loaded from a keyboard PLA 41 which decodes inputs provided from keyboard sensing strobe 42 via buffers 43 and keyboard 2, thereby decoding key pushes at keyboard 2. Keyboard latches 39 store a code indicative of the last key depressed at keyboard 2.

Debounce Logic 44 is provided for hardware debouncing key pushes at keyboard 2. The outputs of the keyboard latches 39 may be inserted into program counter 31 via Program Counter (PC) Insertion Logic 45 under control of instruction register/branch logic 35 or may be inputted to arithmetic unit 40 via a serializer 46 when a Keyboard Latch to Register A Instruction (Section G, Table I) has been decoded.

A portion of the instruction word stored in the instruction register 33 is loaded via serializer 47 into B Input Control 48 for Arithmetic Unit 40 for selected arithmetic operations involving a constant (See Section C, Table I).

A data memory is provided by shift registers A–D and M which are used for storing ten digit data words having the format shown in FIG. 5A. Only the A and B registers may be inputted into arithmetic unit 40 (via A input control 49 and B input control 48, respectively) for addition or subtraction operations. The C register and M register interconnections with A input control 49 are used for exchanging the data with the A register, which exchanges are carried out via arithmetic unit 40 but arithmetic unit 40 is not then used to alter the data. The register input logics 50A–50D and 50M are used to provide recirculation paths and data transfer/exchange paths. Input logic 50A preferably receives the output from arithmetic unit 40 and thus register A is preferably the only register from which the output arithmetic unit 40 may be directly supplied. Thus in the preferred embodiment of the microprocessor, only the contents of the A and B registers may be directly supplied to the arithmetic unit 40 for arithmetic operations and the results of such arithmetic operations may only be directly provided back to the A register. The contents of the other registers, C, D and M, may be operated upon if the contents of Registers A or B are inserted into Registers A or B. The contents of the C register may be inserted into A register, or the contents of the A register may be inserted into the C register or the contents of the A and C registers may be exchanged. Similarly, the contents of the B register may be inserted in either the C or D registers or exchanged with either of those registers. Also, the contents of the M register may be inserted in the A register or exchange therewith. While these limitations on how the various registers, A–D and M, may be inputted to the arithmetic unit or manipulated to transfer data therebetween tend to increase the number of instructions required for performing arithmetic operations, it has been found that the chip silicon area saved by (1) limiting the hardware interconnections between the various registers and the arithmetic unit and (2) limiting the number of different types of instructions which must then be decoded more than makes up for the additional silicon area used for providing extra instructions in ROM 30. These extra instructions occur, for instance, because before the contents of register D may be manipulated in the arithmetic unit, the contents of register D must first be inserted or exchanged with the contents of register B, thereby adding an additional register instruction before an arithmetic instruction. However, with a microprocessor performng, in the main, simple arithmetic functions, this technique results in a net savings of silicon area required to mplement the microprocessor chip.

The contents of Register A is outputted to display 3 via display logic 52 which decodes the contents of Register A for energizing appropriate segments of display 3.

SYSTEM TIMING

Figure 4A:
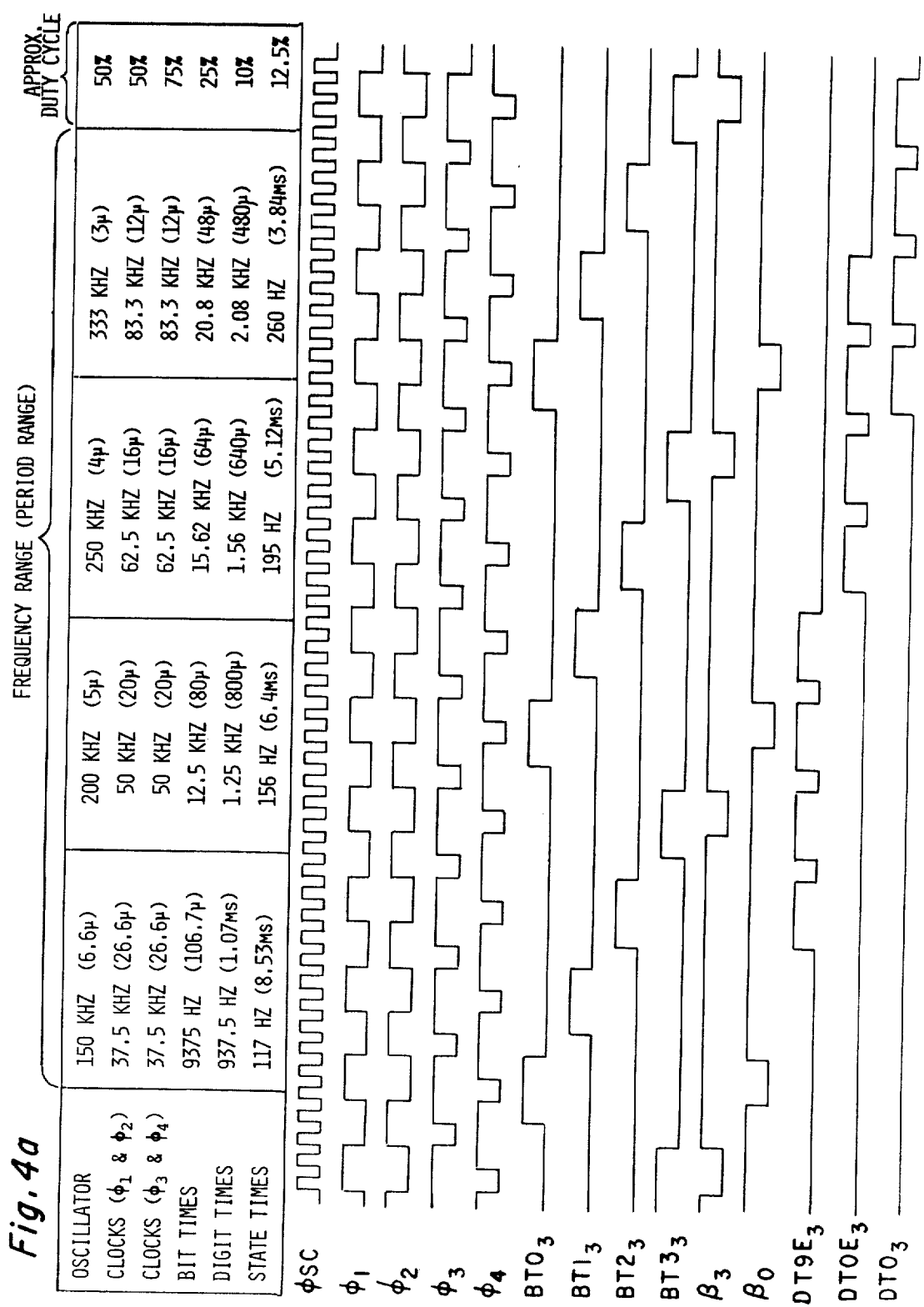
FIGS. 4a and 4b depict the timing signals generated by a clock generator implemented in the microprocessor system, the timing signals being shown in representative form.
Figure 4B:
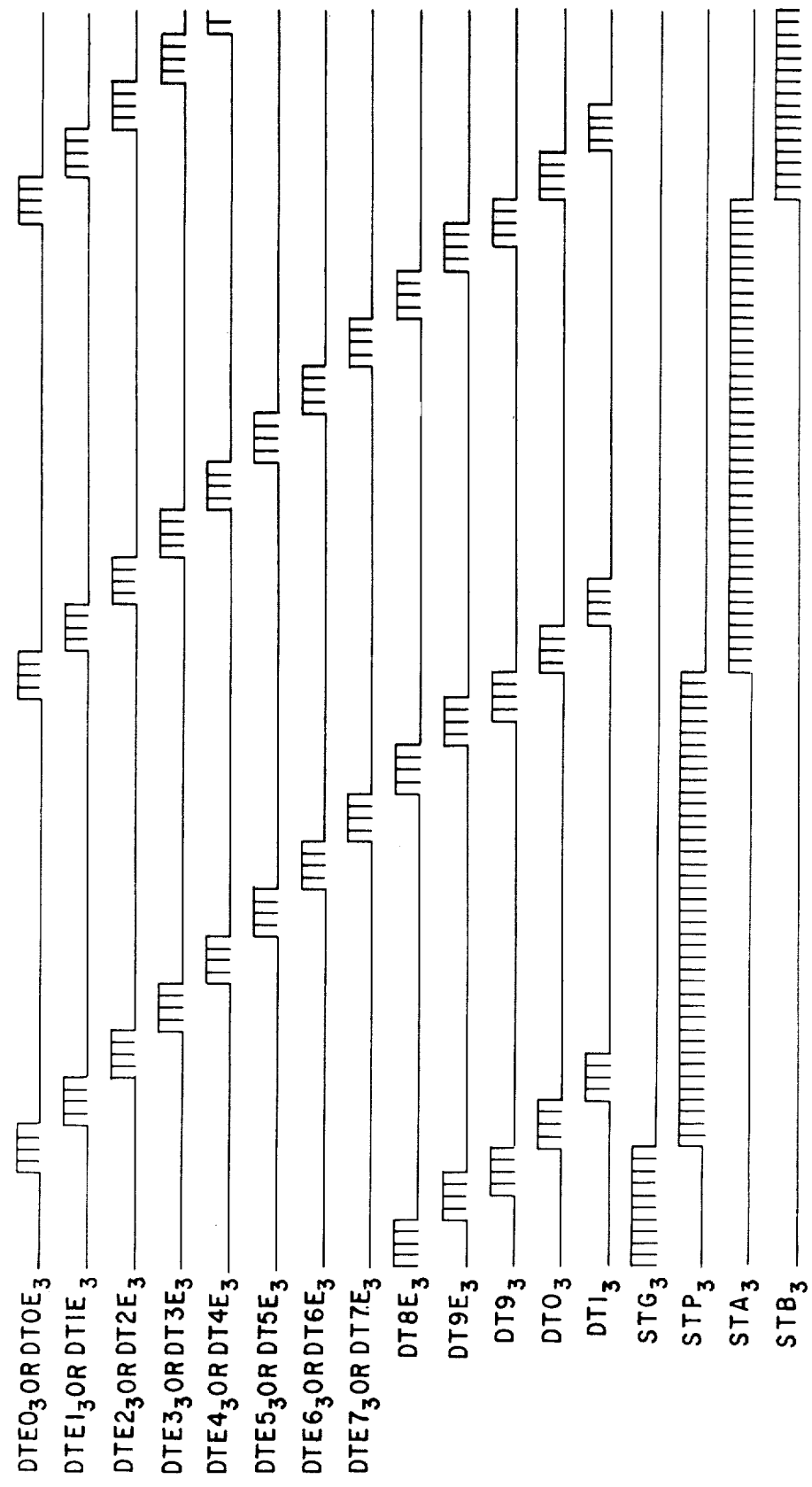

Referring now to FIGS. 4a and 4b, there is shown, in representative form, the timing signals generated by the clock generator 51 implemented on chip 10. The clock generator's oscillator preferably has a frequency in the range of 150 KHz to 333 KHz, with a nominal frequency of 200 KHz. As is shown in FIG. 4a, there are two main clock phases ($\phi1$ and $\phi2$) and two precharge clock phases ($\phi3$ and $\phi4$). Phase $\phi3$ goes low during the first half of phase $\phi1$ and serves as a precharge therefor. Phase $\phi4$ goes low during the first half of phase $\phi2$ and serves as a precharge therefor. The bit times BT0-BT3 each comprise a clocking pulse whose period is shown in FIG. 4A, each being the period of time for clocking one bit of data in the calculator. Four bit times, BT0 to BT3, comprise the time necessary to clock one digit of date (of four bits) and thus comprise a digit time. As digit times, DT0-DT9, each provide a period of time for clocking one digit (either binary corrected decimal or hexadecimal) in the calculator, the period of ten digit times DT0 to DT9 provide the time for clocking all ten digits in the data words. Early digit times, DT0E-DT9E, correspond to digit times DT0-DT9, but are generated two bit times early. Ten digit times (DT0 to DT9) comprise an instruction cycle having a period of 640 microseconds at a nominal clock frequency of 200 KHz. Successive instruction cycles are labeled state times A-G and P (STA-STG and STP) in as much as the segments A-G and P in the display are repeatively enabled during state times A-G and P occurring during display operation. Beta tines $\beta0$-$\beta3$ correspond to bit times BT0-BT3 but are inverted and are shortened by the period of the $\phi3$ precharge clock cycle.

The calculator embodying the present invention uses four phase MOS logic which elminates need for most power supply lines on the chip but requires that the precharge times be carefully selected to eliminate possible race conditions. Thus for clocked gates connected in series, the gate level should be inverting and a gate which is precharged on phase $\phi3$ should drive a gate precharged on phase $\phi4$ and conversely a gate precharged on phase $\phi4$ should drive a gate precharged on phase $\phi3$. Gates having the same precharge phase however may be connected in series if a static inverter is interposed between them. In the drawings of the detailed logic diagrams of the chip 10, the clocked gates are shown with a numeral three or four to indicate which precharge cycle, $\phi3$ or $\phi4$, that particular gate is driven on. Static gates are shown with an "S". The signals from th gates are often provided with a subscript indicating which precharge cycle, $\phi3$ or $\phi4$, that signal was generated on. While this precharge logic is utilized to conserve chip silicon area and to reduce power consumption, the features of the microprocessor disclosed are not dependent on the use of such logic.

According to the aforementoned convention, bit times labeled $BT0_3$, $BT1_3$, etc, indicate that the bit time is zero or one, as indicated, and that the signal was generated from a gate driven on a phase $\phi3$, precharge. The detailed logic diagrams of FIGS. 8-29 also use some timing signals not previously described; for instance, timing signal 923 indicates digit times 9, bit time 2 from a gate operated on a phase $\phi3$ precharge. The same convention is used with other timing signals having three numerals.

INSTRUCTION SET

Table I lists the instructions which may be programmed into ROM 30 for controlling the operation of the calculator. A set of instruction words storable in ROM 30 for implementing this calculator is shown in Table II. Referring now to Table I, it can be seen that Table I is divided into Sections A-G for describing various instruction word types. Each instruction word type refers to one of FIGS. 6a-6h, which shows the format of each instruction word type.

Branch instructions (Section A) indicate whether the branch is conditional and if conditional on which flag or latch the branch is to be conditioned. The status bit, S, is used to indicate whether conditional branches are to be executed based on whether the selected flag or latch has been reset or set. The instruction word word immediately following a branch instruction or a call instruction word provides the address to be inserted into program counter 31. It should be noted that the length of an instruction word is nine bits and that the length of the program counter is likewise nine bits. Covnentionally, the branch address was included as part of the branch instruction word, which typically forced the intruction word to be longer than the address loaded into program counter 31. It has been found, however, that a more efficient use of available chip silicon area may be made if the instruction word is shortened to the same length as the program counter address. This may be accomplished by utilizing a two instruction cycle branch wherein the first instruction word is a branch instruction and the second instruction word is a branch address. This is an important feature of this invention for reducing the amount of silicon area used to implement an electronic microprocessor chip.

The formats of subroutine and done instructions, whose functions have previously been described, are described in Section B of Table I.

The arithmetic instructions, Section C of Table I, are limited to operations involving register A and a constant or operations involving A and register B. As has been previously discussed, this is an important feature of this invention for reducing the total amount of chip silicon area acquired to implement an electronic microprocessor. The masks which may be generated for the arithmetic instructions are shown in FIG. 5b. The sections D through G of Table I list the instructions for performing shifts on the contents of register A, for interchanging the various registers with one another, for setting and resetting selected flags and for loading the contents of the key latches 39 into the A register via serializer 46, B input control 48 and arithmetic unit 40.

DATA WORD FORMAT AND ASSOCIATED MASKS

Referring now to FIG. 5a, there is shown the format of the data words stored in registers A-D and M. As aforementioned, each data word comprises ten digits of serial data, each digit comprising four serial bits. Thus, an entire data word comprises forty (eg, 10×4) bits. At digit time DT0, the data words are stored in the registers A-D and M as shown in FIG. 5a. That is, the least significant digit, $D_0$, is stored in that portion of the A-D and M registers ready for insertion into A input control 49 or B input control 48 or for recirculation via input logics 50B-50D and 50M, as required. The most significant digit position, D9, stores a hexadecimal code indicating decimal point position. The next most significant digit position, D8, holds the overflow digit for carries outside the normal eight digit field. Digit positions D7–D0 holds eight digits of binary coded decimal data.

In FIG. 5b there is shown the mask codes which may be incorporated in the arithmetic instruction words implemented in ROM 30; the set of instruction words using mask codes are described in Section C, Table I. the masks, which are generated by instruction decoder logic 34, indicate to B input control 48 either (1) which digits of the ten digit data word are to be passed from register B for addition to or subtraction from the corresponding digits of the contents of the A register in arithmetic unit 40 or (2) which digits of the contents of register A are to be added to the output of serializer 47 during a constant addition. As can be seen from FIG. 5b, there are five masks, having codes 000–011 and 111 which are listed and are associated with a rectangle beneath the representation of a ten digit data word. The digits enclosed by the rectangle associated with a particular mask are permitted by the mask decoder logic in instruction word logic 34 to pass to arithmetic unit 40 during an arithmetic operation. As will be seen with respect to a detailed discussion of the mask logic, the mask codes cause B input control 48 to operate in timed relation with the data passing from the A register into the arithmetic unit via A input control 49. As can be seen from FIG. 5b, there are three possible mask codes which are not defined thereat, namely 100, 101 and 110. Mask 110 actually produces a least significant digit (LSD) mask but may only be used with a key latch to register A operation (See Section G, Table I). Mask 101 and 110 produce no mask at all by B input control 48 but are reserved for decoding the family of flag operation instructions and register operation instructions, respectively.

THE DISPLAY

Referring now to FIGS. 7a and 7b, there is dramatically shown in FIG. 7a the ten decimal digits, 0–9, displayable by a seven segment character display along with an eighth segment used as a decimal point. With respect to FIG. 7b, the character segments are labeled Segments A–G and the decimal point segment is labeled P. For each character position, there is a common cathode 9 provided for the eight segments as is shown in FIG. 7b. The eight segments A–G and P for each character position are respectively connected in common by conductors $S_A$–$S_G$ and $S_P$. The chip 10 uses segment scanning according to the method disclosed by U.S. Pat. No. 4,014,012 wherein the segments are scanned sequentially and the digit cathodes are selectively energized in connection with the scanning of the segment electrodes to form the characters 0–9 and a decimal point. By using the segment scanning method of U.S. Pat. No. 4,014,012, the display drivers generally used heretofore in the prior art are eliminated. Thus, chip 10 may be directly interconnected with display 11 when the display comprises an array of light emitting diodes.

DETAILED DESCRIPTION OF SYSTEM LOGIC DIAGRAMS

The various parts of the system of FIG. 3 will now be described with reference to FIGS. 8–12 and 14–29 which depict, in detail, the logic circuits implemented on chip 10 to form the circuits depicted by the block diagram on FIG. 3. The following discussion, with reference to the aforementioned drawings, will refer the logic signals available at many points on chip 10. It is remembered that a logical zero corresponds to a negative voltage, that is, $V_{DD}$, while a logical one refers to zero voltage, that is, $V_{SS}$. It should be further remembered that the P-channel MOS transistors depicted in the afornentioned figures are conductive when a logical zero, ie, a negative voltage, is applied at their respective gates. When a logic signal is referred to which is unbarred, ie, has no bar across the top of it, the logic signal is to be interpreted as "True" logic; that is, a binary one indicates the presence of the signal ($V_{SS}$) whereas a binary zero indicates a lack of the signal ($V_{DD}$). Logic signal names including a bar across the name thereof are "False" logic; that is a binary zero ($V_{DD}$ voltage) indicates the presence of the signal whereas a binary one ($V_{SS}$ voltage) indicates that the signal is not present. It should also be remembered that the numeral 3 in a clocked gate indicates that phase $\phi 3$ is used as the precharge whereas a 4 in a clocked gate indicates that phase $\phi 4$ is used as the precharge clock. An S in a gate indicates that the gate is statically operated.

In the following drawings a three or four digit number is used to refer to the logic devices depicted thereon; the first digit of the three digit number and the first two digits of a four digit number are used to denote the particular figure upon which the element is shown and described with reference to. Thus, for such numbered elements, the following discussion may not refer separately to the figure upon which the particular device is shown.

PROGRAM COUNTER

Figure 8A:
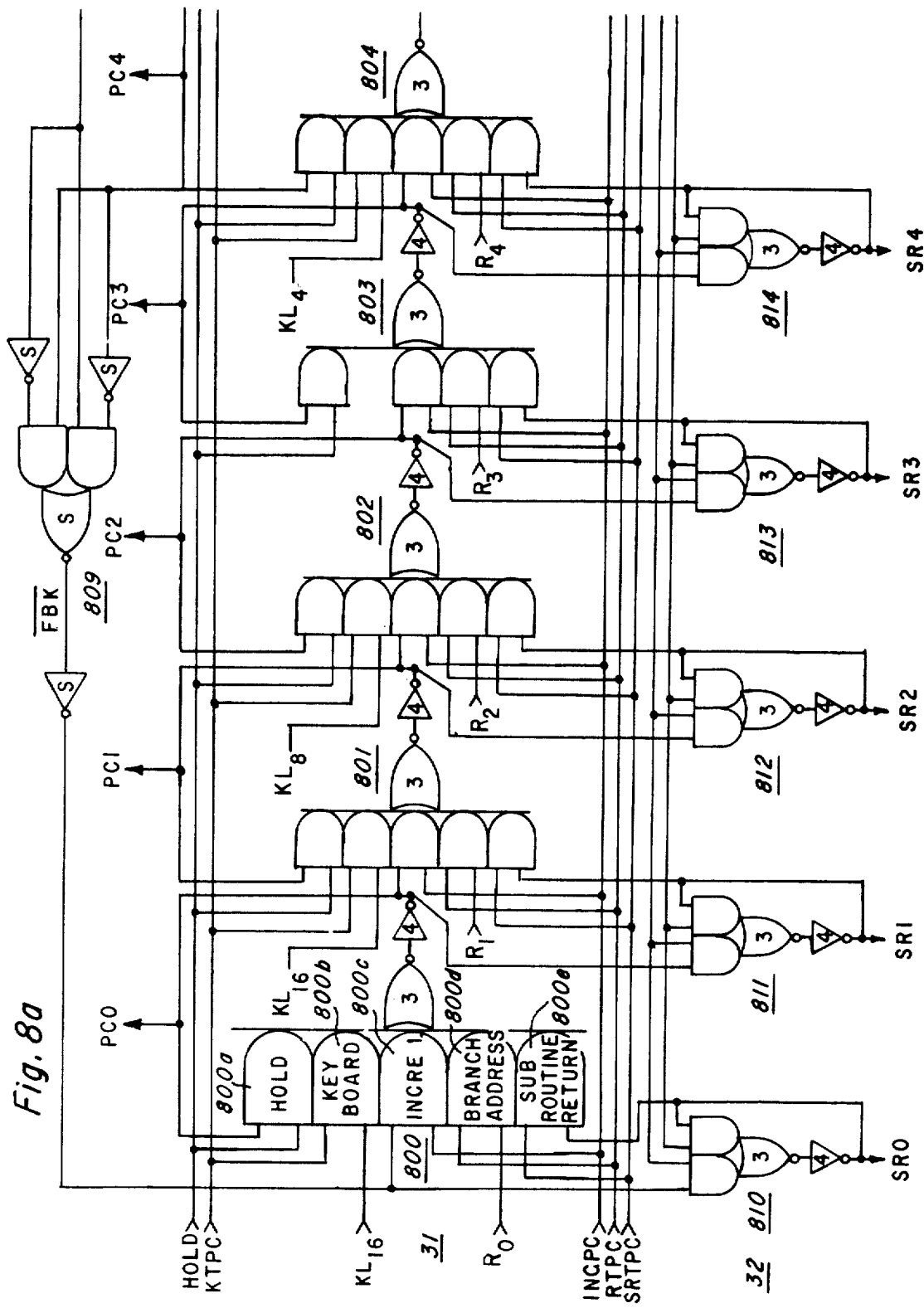
FIGS. 8a and 8b are a logic diagram of the system's program counter.
Figure 8B:
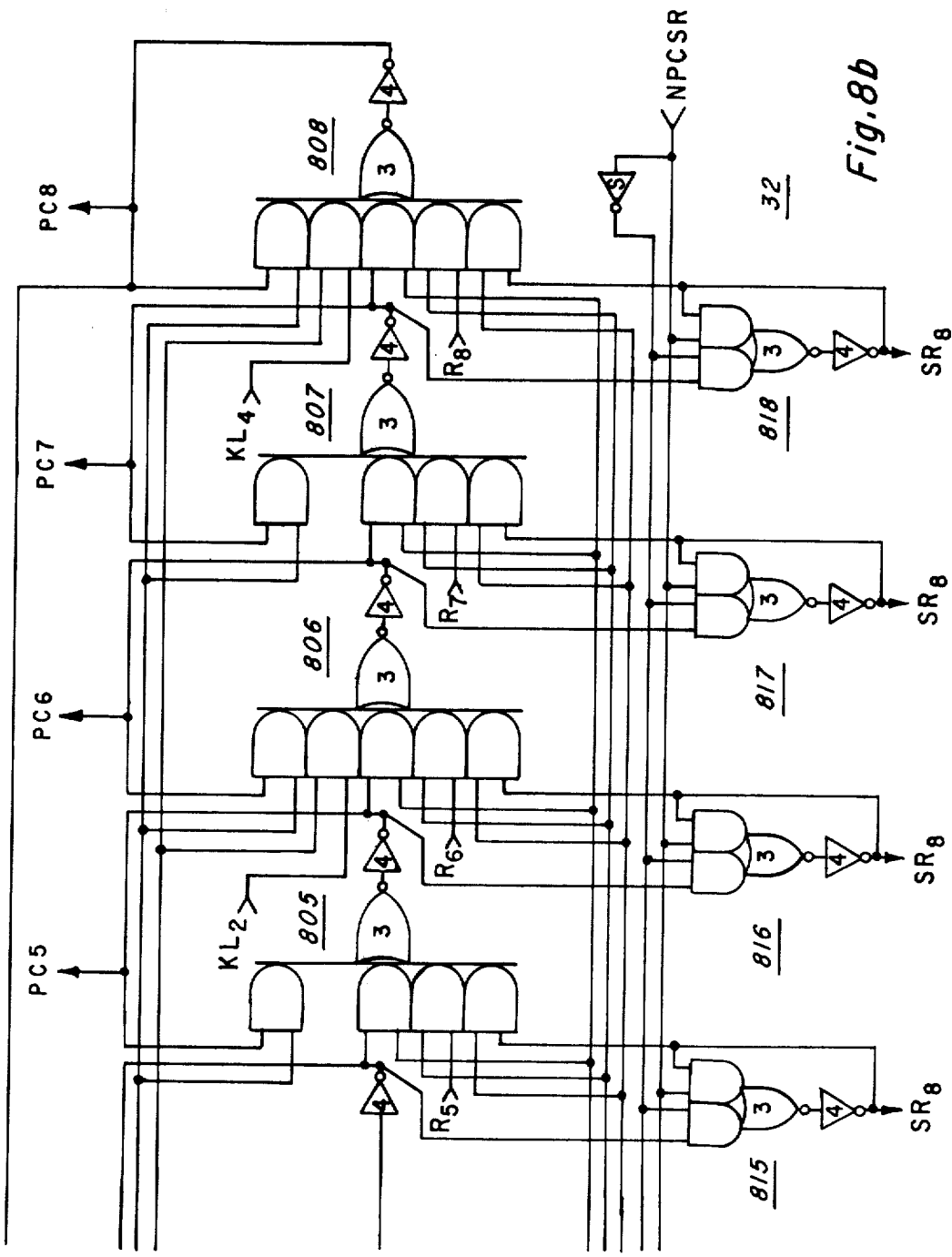

Referring now to FIGS. 8a and 8b, there is shown a logic diagram of program counter 31 and subroutine register 32. Program counter 31 comprises a nine stage shift register comprising stages 800–808, each stage comprises several AND gates (eg, 800a–800c) whose output is connected to a NOR gate with a phase $\phi 3$ precharge. The output of the NOR gate is coupled to an inverter having a $\phi 4$ precharge. One of the AND gate (eg. 800a) is responsive to the output from the inverter and to a "HOLD" control signal. AND gate 800b is responsive to the control signal "KTPC" (Keyboard latch to program counter) and to an output from a keyboard latch, in this case, KL16. AND gate 800c is responsive to the output from feed back logic 809 and to a control signal INCPC (Increment Program Counter). AND gate 800d is responsive to the output of read-only-memory 30 and to the control signal "RTPC" (ROM To Program Counter) and finally AND gate 800c is responsive to the output from a subroutine register 32 and to a control signal SRTPC (Subroutine To Program Counter). Each of the AND gates in the other stages, 801–808 are identical to that described except that (1) the input to the incrementing AND gate (eg, 801c) is derived from the output from the prior stage and (2) only selected stages receive outputs from the keyboard latch; therefore, the NAND gates equivalent to 800b are not provided for all stages. Feedback logic 809 is responsive to the output from stages 804 and 808 and performs an "exclusive OR" function; thus, whenever the address in the program counter is "incremented", it is done as psuedorandom fashion. Table II lists the instruction words in logical order and thus shows the pseudorandom count generated by program counter 31. It should be evident to one skilled in the art that program counter 31 which has nine stages, will pseudorandomly count through 511 of the 512 possible states. The HOLD signal is used to retain the address presently in program counter 31 while INCPC pseudorandomly increments the number in the program counter. If no signal is provided on any of the lines HOLD, KTPC, INCPC, RTPC, or SRTPC a zero location is automatically loaded into program counter 31. The outputs from the various stages of the program counter, PC0–PC8, are provided to ROM 30 and to an input of subroutine register 32.

Subroutine register 32 comprises a nine bit address memory, comprising latches 810–818. Each subroutine register latch is responsive to the output from a corresponding stage of program counter 31 for loading the latch in response to an NPSCR signal and for latching the address stored therein in response to a $\overline{\text{NPSCR}}$ signal.

INSTRUCTION MEMORY

The instruction memory is preferably implemented as a 512 bit read-only-memory (ROM 30). The ROM 30 used in this microprocessor is not depicted in detail; however, it is responsive to the address (PC0–PC8) supplid by program counter 31 and is preferably of the virtual ground type disclosed in U.S. Pat. No. 3,934,233 by Roger J. Fisher granted Januray 20, 1976 and assigned to the assignee of this invention. Using the virtual ground ROM of U.S. Pat. No. 3,934,233 permits the size of ROM to be significantly reduced in comparison to the ROM typically used in the prior art by using one ground or $V_{SS}$ line for five or more P diffusions.

ROM 30 may be programmed with the instruction words listed in Table II for implementing an electronic calculator. Table II lists each instruction word and its pseudorandom address.

INSTRUCTION WORD DECODER LOGIC

Figures 9, 10:
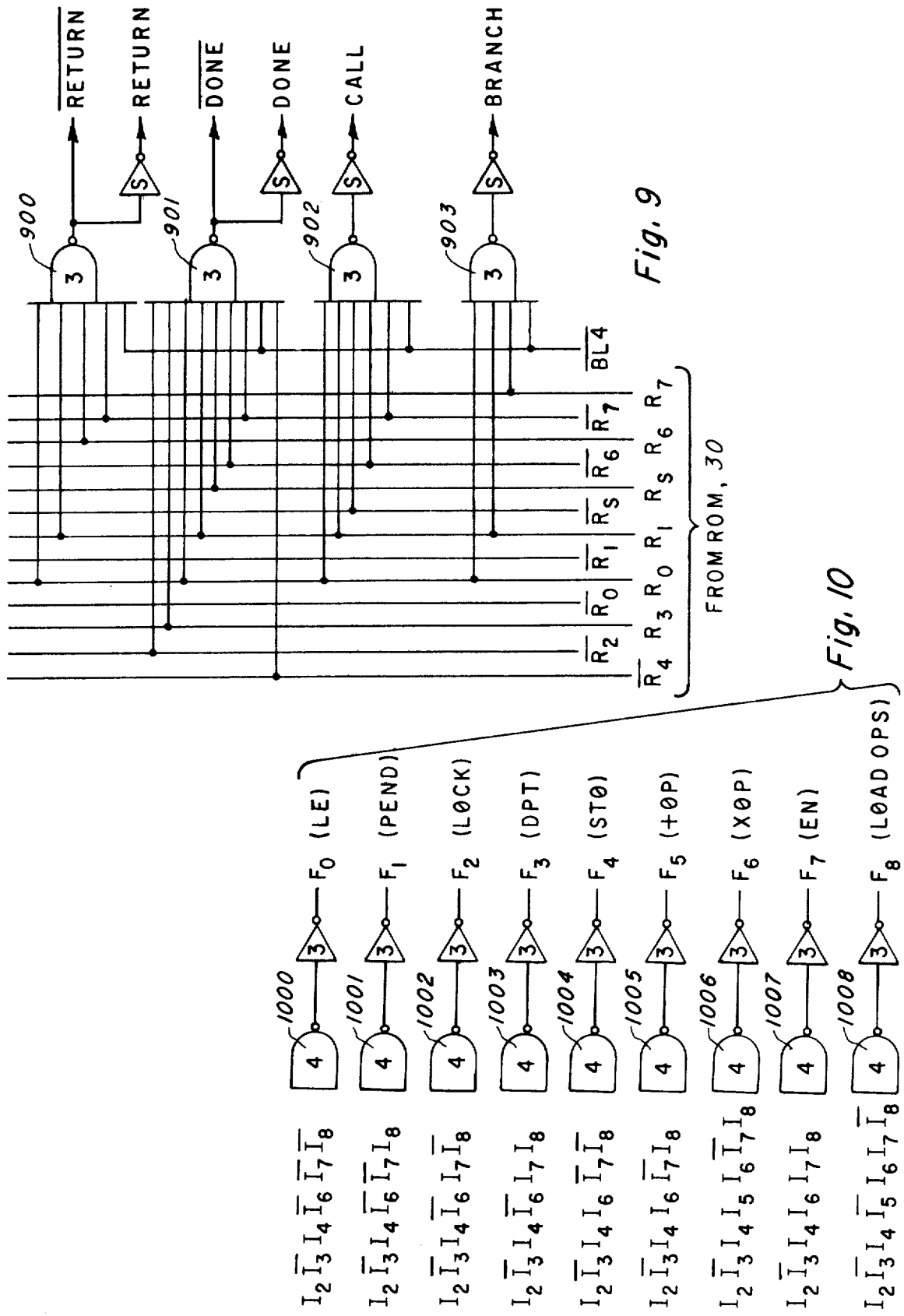
FIG. 9 is a logic diagram of that portion of instruction word decoder logic for decoding return, done, call, and the branch family of instructions.
FIG. 10 is a logic diagram of that portion of instruction word decoder logic for decoding flag instructions.
Figure 11:
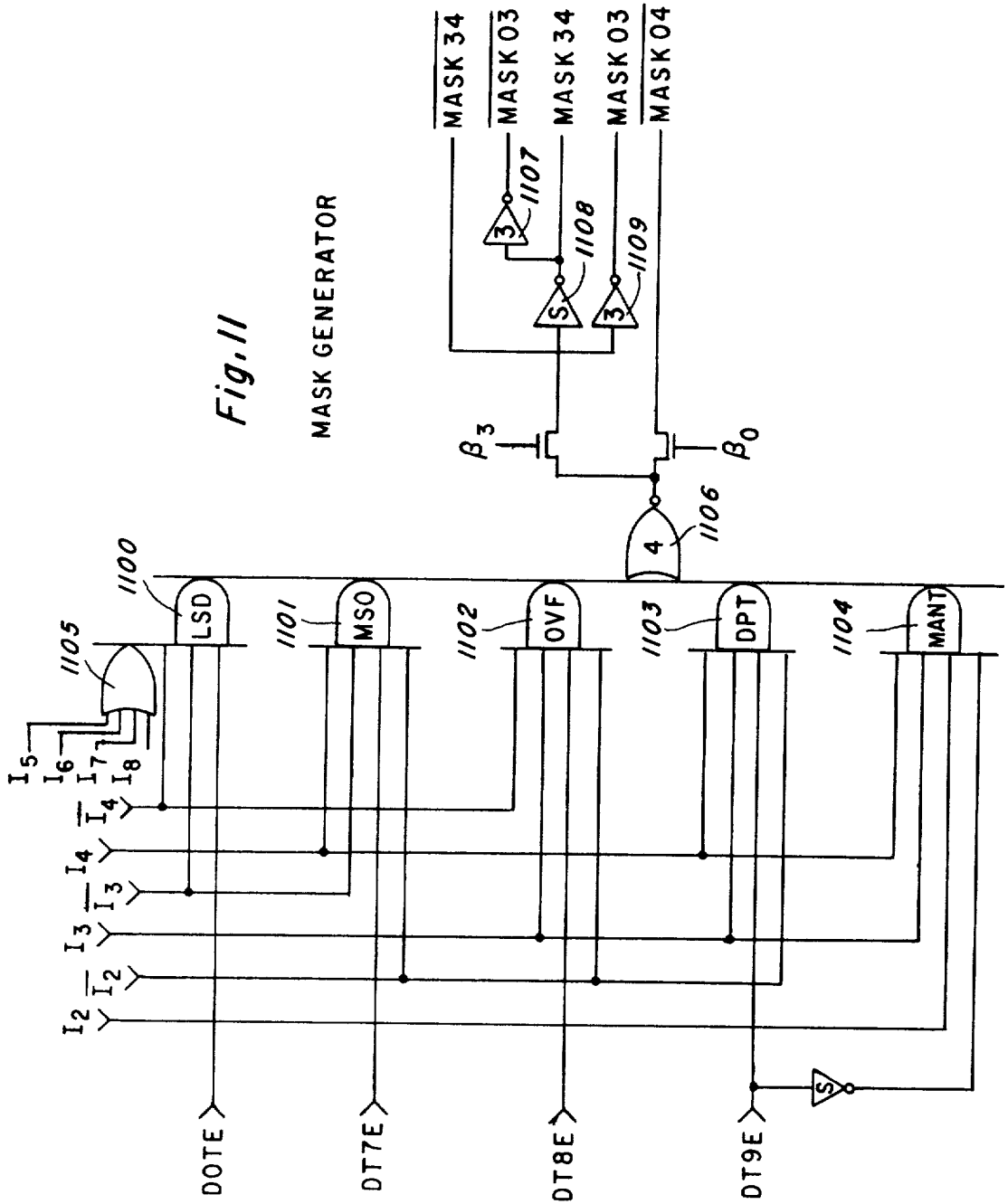
FIG. 11 is a logic diagram of the mask generator portion of instruction word decoder logic.

Referring to FIG. 9 there is shown that part of the instruction word decoder logic 34 used to decode RETURN, DONE, CALL AND BRANCH family of intructions. NAND gate 900 is arranged to decode the RETURN instruction while NAND gate 901 is arranged to decode the DONE instruction. NAND gate 902 decodes the CALL instruction while NAND gate 903 decodes BRANCH instructions. Thus NAND gates 900–903 are responsive to the instruction word from ROM 30 and are also responsive to $\overline{\text{BL}}$. $\overline{\text{BL}}$ is a signal provided by the BRANCH latch 36 indicating that the address following a BRANCH instruction is then being outputted from the ROM; thus Bl disables NAND gates 900–903 so that they do not decode the BRANCH address. NAND gates 900–903 are responsive to the instruction word outputted from ROM 30, rather than the instruction word in instruction register 33 (which cannot be a branch, call, return or done instruction). Thus NAND gates 900–903 provide instruction word decoder logic means for decoding the instruction word outputted from the instruction memory or ROM 30.

In FIG. 10 there is shown a series of NAND gates 1000–1008 for decoding which Flag Latch 38 is beng addressed by a flag operation. In as much as NAND gates 1000–1008 are responsive to instruction words outputted from the instruction register 33, which is not loaded with either a branch instruction word or a branch address instruction word, NAND gates 1000–1008 need not decode either the $I_0$ or $I_1$ bits of an instruction word. Further NAND gates 1000–1004 and 1007 are not responsive to the $I_5$ bit indicating a set or reset function, in as much as flag latches 2200–2205 are responsive to the $I_5$ bit.

The instruction decoder logic 34 includes a mask generator for controlling the digits inputted to the arithmetic unit 40 by B input control 48, as aforementioned. Gates 1100–1104 decode the least significant digit (LSD), most significant digit (MSD), overflow (OVF), decimal point (DPT), and mantissa (MANT), masks in arithmetic instruction words outputted from instruction register 33. The various arithmetic instructions are defined in Section C of Table I and the various masks are defined in FIG. 5b. AND gate 1100 is responsive not only to bits of the instruction word forming a LSD mask but also the output of an OR gate 1105. OR gate 1105 is responsive to the $I_5$–$I_8$ bits of the instruction word for invalidating the LSD mask when a NO-OP instruction word is encountered. A NO-OP instruction word is defined as an arithmetic operation where the constant zero is added to the A register in Section C of Table I; however, that addition is not accomplished, the data words merely recirculate. The LSD mask is invalidated at this time so that the addition is not made. Of course, making the addition would not change the number in the A register; however, making the addition could change what ever had been previously loaded into the Carry Latch 37 as result of a prior arithmetic operation. Therefore, in order for a NO-OP instruction to be a true no operation instruction, the Carry Latch 37 must not be altered. Consequently, the LSD mask is not generated for this particular instruction and hence the reason for decoding the $I_5$–$I_6$ bits in OR gate 1105. The outputs of NAND gates 1100–1104 are provided to a NOR gate 1106 whose output is provided via $\beta_0$ and $\beta_3$ controlled transfer gates. The outputs of the $\beta_3$ controlled transfer gate is provided to three inverters 1107–1109 for providing the $\overline{\text{MASK 34}}$, $\overline{\text{MASK 03}}$, MASK 34, MASK 03, and $\overline{\text{MASK 04}}$ signals. The first number indicating the bit time and the second number indicating the precharge time of the particular mask signal. AND gates 1100–1104 are responsive to DT0E, DT7E, DT8E, DT9E and $\overline{\text{DT9E}}$ respectively for generating the appropriate mask in the appropriate digit times, according to the mask scheme shown in FIG. 5b.

Figure 12:
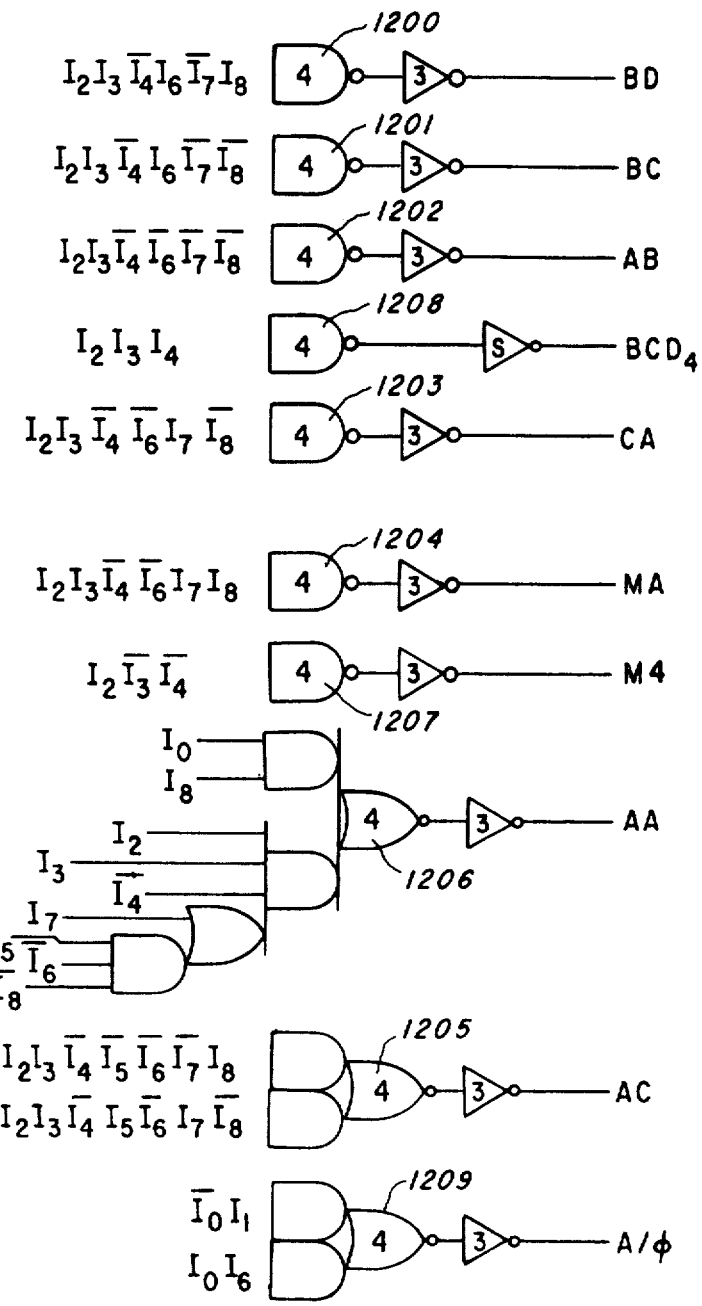
FIG. 12 is a logic diagram of that portion of the instruction word decoder logic used for decoding most register operation instructions and some arithmetic instructions.

In FIG. 12, there is shown that portion of instruction word decoder logic 34 used for decoding most of the register operation instructions (Section E, Table I) and some of the arithmetic instructions (Section C, Table I). NAND gates 1200–1204 decode the instruction word in instruction register 33 for producing signals BD, BC, AB, CA and MA, respectively. Signal BD indicates either a Register B to Register D (B→D) transfer instruction or a Register B-Register D (B/D) exchange instruction has been decoded. The same convention applies to signals BC, AB, CA and MA. As will be seen, the $I_5$ bit indicating whether it is an exchange or transfer operation is decoded locally at the input logics 50B and 50M to register B and D and at the input to arithmetic unit 40 at A input control 49. Complex gate 1205 generates signal AC by decoding either an A→C transfer instruction or an C/A exchange instruction, but not an C→A transfer instruction.

Complex gate 1209 decodes the A/φ bit in the two types of arithmetic instruction (A×B or A×K). Complex gate 1206 decodes the $\overline{\text{AA}}$ signal. When $\overline{\text{AA}}$ is a logical one, the output of the Register A is not passed through A input control 49, which is done during (1) shift operations or (2) register operations involving the A register other than A→B and A→C transfer instructions. For all other conditions, the output of Register A is applied to A input control 49 and thus the normal data recirculation path for Register A is via A input control 49 to arithmetic unit 40 and back into the A register via input logic 50A. Of course, when the contents of Register A are merely recirculating, no data is passed by B input control 48, because of the absence of a mask signal.

Nand gate 1207 decodes the key latch to register A instruction (See Section G, Table I) producing an M4 signal in response thereto. NAND gate 1208 decodes MANT mask during arithmetic operations involving the A and B register for producing an BCD signal which signals the arithmetic unit 40 to perform automatic binary coded decimal correction. As will be seen, for other operating conditions, the arithmetic uni automatically operates in hexadecimal.

The foregoing discussion of the instruction word decoder logic 34 has accounted for most of the decoding of the instruction words listed in Table I. As been previously noted, selected bits of some instruction words have not been decoded in the instruction word decoder logic 34 but decoded locally. The decoding of these particular portions of instruction words will be discussed with reference to the elements which decode those instruction word bits.

as can be seen, the portions of instruction word decoder logic 34 used to control the flag logic (FIG. 10), the mask generator (FIG. 11) and register operations (FIG. 12), are responsive to the instructon word in instruction register 33 and thus these decoders need not decode branch, branch address, call, return or done instructions which are not loaded into instruction register 33. The nO-OP instruction which is then loaded into instruction register 33 merely permits the data in the registers A-D and M to recirculate. Thus, the foregoing decoders provide the instruction word decoder logic means for decoding the instruction word outputted from the instruction register 33.

DATA REGISTERS, REGISTER INPUT LOGIC AND ARITHMETIC UNIT INPUT CONTROL

Figure 13:
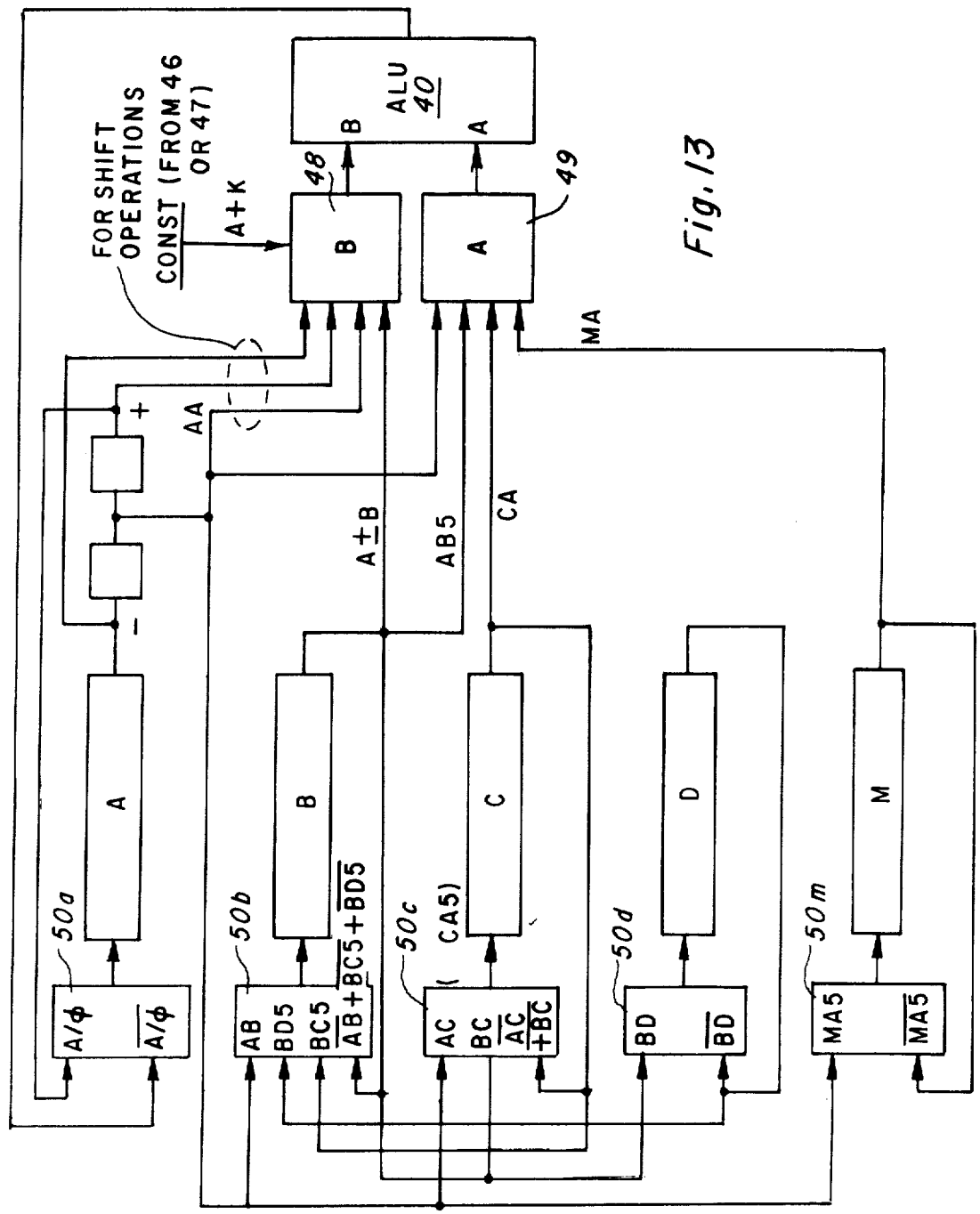
FIG. 13 is a detailed block diagram of registers A-D and M, register input control logics, arithmetic unit, and arithmetic unit input controls.

In FIG. 13 there is shown a more detailed block diagram of registers A-D and M, their input logics 50A-50D and 50M, arithmetic unit 40, A input control 49 and B input control 48. Within A input control 49 and B input control 48 the register control logics 50A-50D and 50M, are indications of which of the data control signals are decoded for enabling the data transfer paths shown. The format for the signal names shown in FIG. 13 agrees with the control signals decoded by the decoders on FIG. 12 except that if the $I_5$ bit being decoded indicates an exchange instruction (eg, B/D) rather than a transfer instruction (eg, B→D), the numeral 5 has been added after the control signal name (eg, BD5). The only control signals shown in FIG. 13 which have not been heretofore mentioned are the A+B and A+K control signals which will be discussed with reference to FIG. 17.

Figure 14:
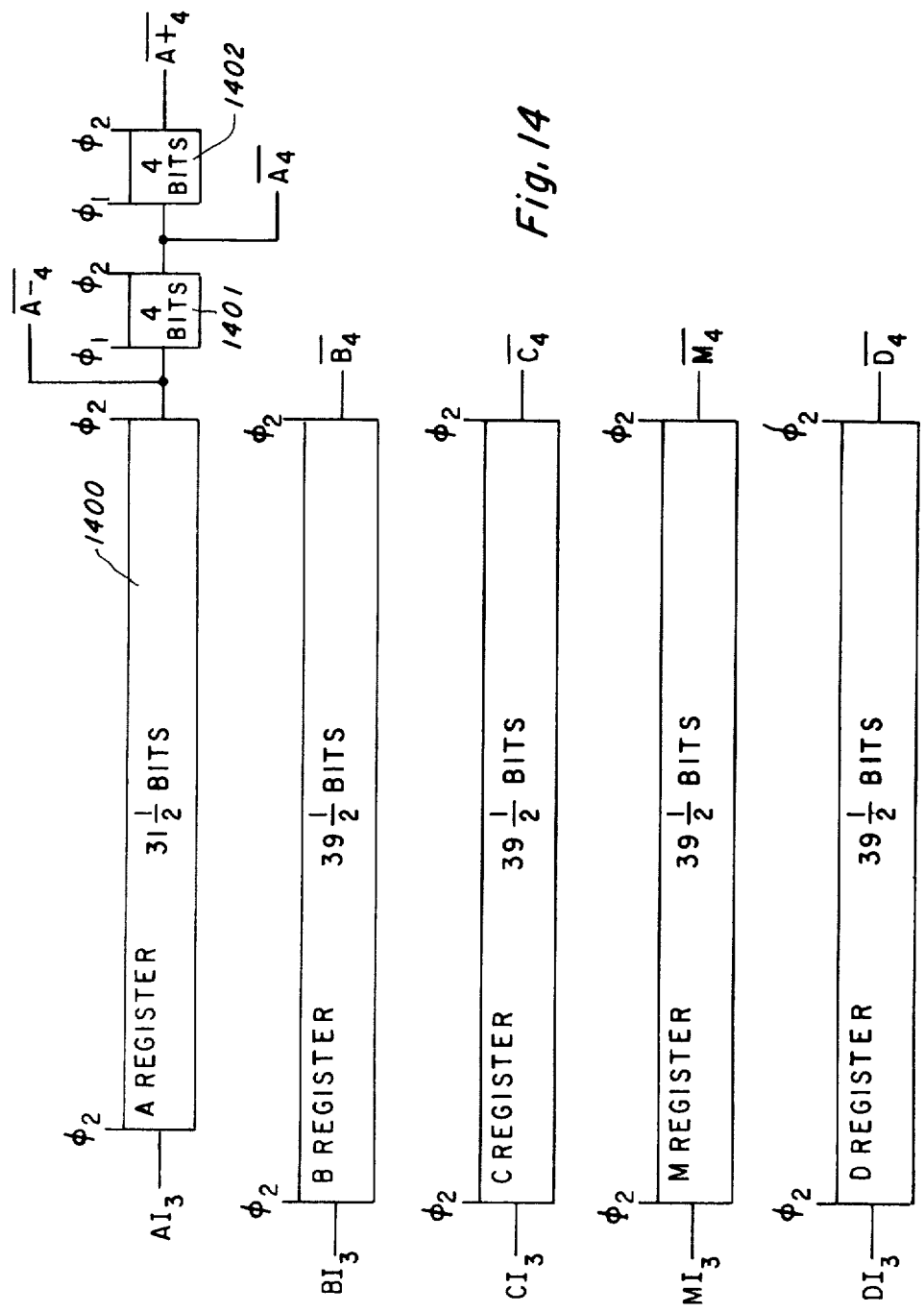
FIG. 14 is a logic diagram of the registers used to implement the calculator's data memory.
Figure 15:
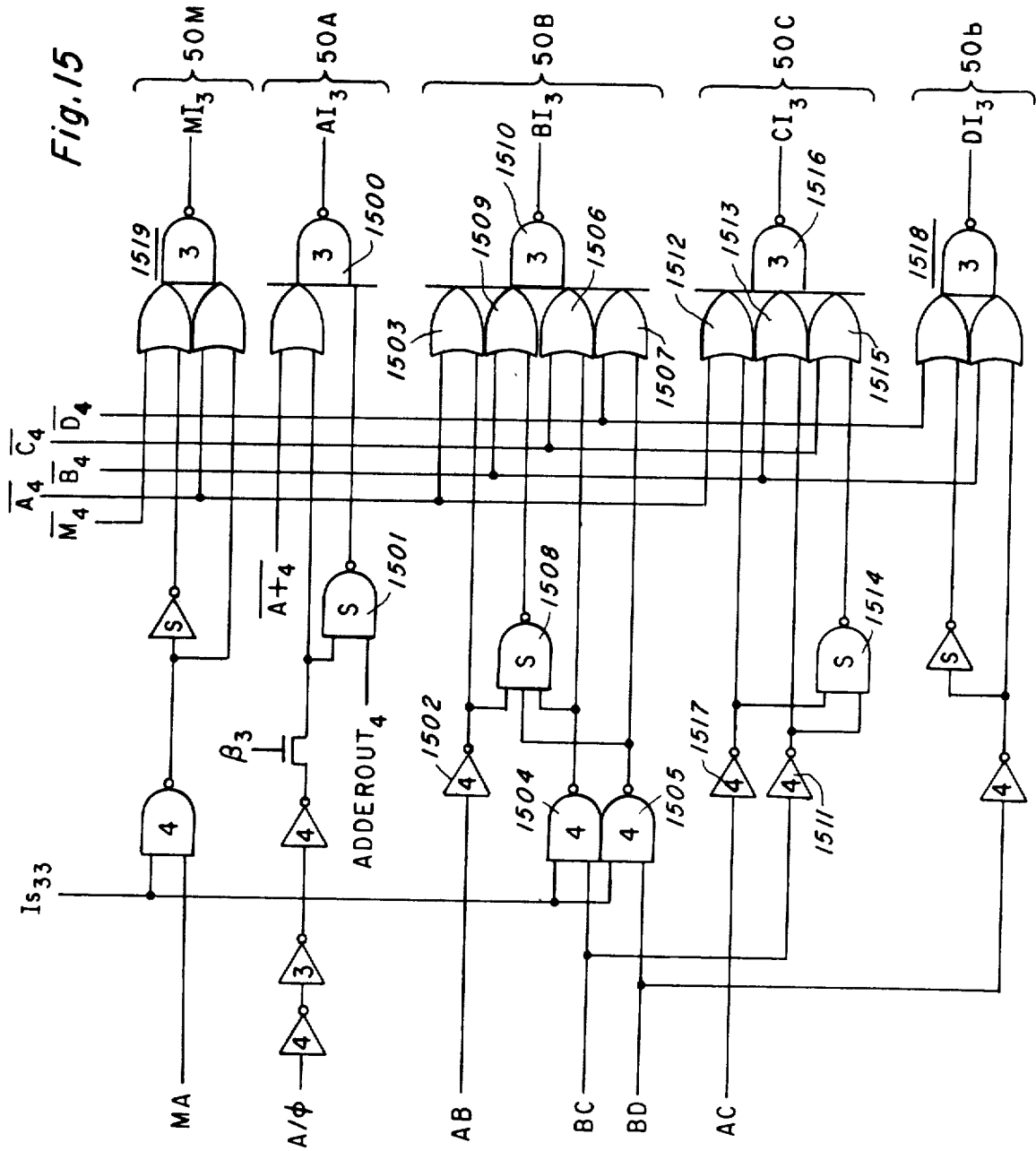
FIG. 15 is a logic diagram of the register input logics.

The microprocessor's data memory is provided by registers A-D and M which are shown in FIG. 14. Registers B-D and M each comprise 39 ½ bits of storage for storing a data word having ten decimal places. Inasmuch as 39 ½ bit are provided, in lieu of 40 bits, the outputs thereof are inverted as compared to the inputs thereof. The major portion of the A register, 1400, comprises 31 ½ bits of storage. The output of shift register 1400 $\overline{A-}$, is connected to a four bit shift register 1401. The output of shift register 1401, $\overline{A_4}$, is provided to another four bit shift register, 1402, whose output is $\overline{A+}$. The normal data path from the A register is from the output of the shift register 1401 for data recirculation, arithmetic operations, and data transfer exchange operations. The $\overline{A-}$ and $\overline{A+}$ outputs are used for shift operations. Additionally the $\overline{A+}$ output is used as a recirculation path for the A register when the output from arithmetic unit 40 is open-circuited when the A/φ bit in the arithmetic instruction words (See Section C, Table I) is a binary one.

As can be seen from register input logic 50A, gates 1500 and 1501 are arranged to normally communicate the output from arithmetic unit 40 (ADDEROUT) into Register A, and to output the $\overline{A+}$ output of the A register into the input of the A register when A/φ from complex gate 1209 is a logical one. Register input logic 50B is responsive to signal AB inverted by inverter 1502 at OR gate 1503 for transferring the contents of register A to the input of register B. It is further responsive to signals BC and BD and the $I_5$ bit of the instruction word at NAND gate 1504 and 1505 whose outputs are connected to OR gate 1506 and 1507 for inserting the output from the C and D registers respectively in response to a B/C or B/D register exchange operations. Further. Further, the outputs from inverter 1502 and NAND gates 1504 and 1505 are provided as inputs to a NAND gate 1508 whose output is connected to OR gate 1509 which is also responsive to the output of register B. Thus, NAND gate 1508 and OR gate 1509 permit contents of the B register to recirculate when none of the other exchange or transfer operations (A/B, A→B, B/C or B/D) is indicated. The outputs of OR gates 1503, 1509, 1506 and 1507 are supplied to a NAND gate 1510 whose output is provided as an input to register B.

Register input logic 50C includes inverters 1517 and 1511 for inverting the BC and AC signals which are then provided to OR gates 1512 and 1513, which are also responsive to the output from registers A and B respectively. The outputs from inverters 1517 and 1511 are also provided to a NAND gate 1514 for providing the recirculation function as did NAND gate 1508 in register input logic 50B. The output of NAND gate 1514 is suplied to an OR gate 1515 along with the output of register C. The outputs of OR gates 1512, 1513, and 1515 are connected as inputs to NAND gate 1516 whose output is connected to the input of register C.

Register input logic 50D is responsive to the BD signal for inputting the contents of the B register or recirculating the contents of the D register as indicated by complex gate 1518.

Register input logic 50M is responsive to the MA signal and the $I_5$ bit for inserting the contents of the A register into the M register when an M/A exchange operation has been decoded and for recirculating the contents of the M register when the exchange operation is not indicated at complex gate 1519.

Figure 16:
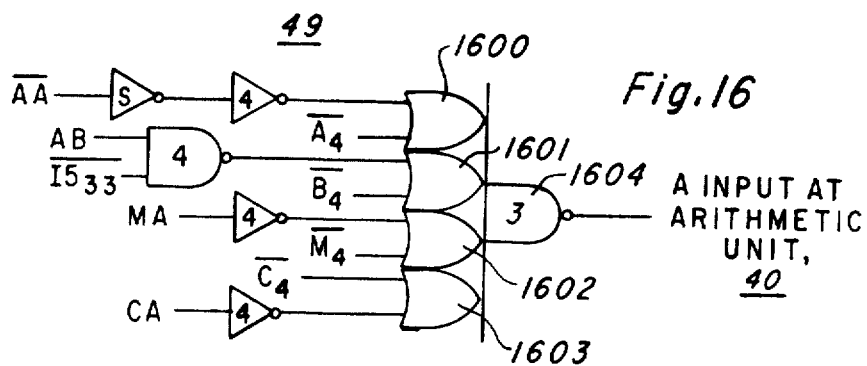
FIG. 16 is a logic diagram of the input control for the A input to the arithmetic unit.

The input control for the A input to the Arithmetic unit 40, that being A input control 49, is shown in FIG. 16. A input control includes four OR gates 1600-1603 whose outputs are connected to a NAND gate 1604 whose output is in turn connected to the A input of arithmetic unit 40. The normal data path is through OR gate 1600 for inputting the contents of Register A into arithmetic unit 40 in response to an $\overline{AA}$ signal from complex gate 1206. OR gates 1601-1603 are enabled inputting the contents of the B, C and M registers into arithmetic unit 40 on an A/B exchange operation and decoding of CA and MA signals respectively.

Figure 17:
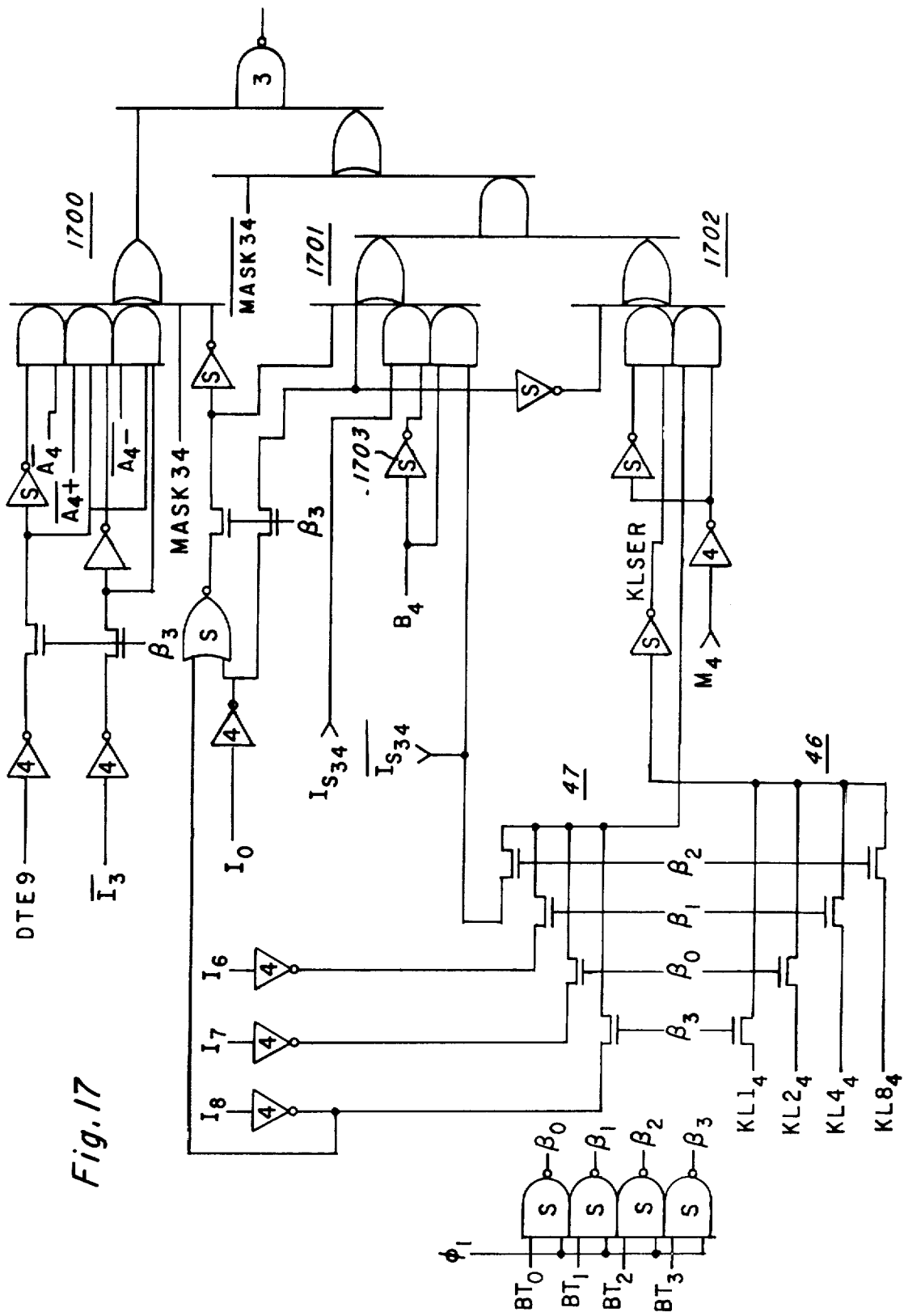
FIG. 17 is a logic diagram of the input control for the B input to the arithmetic unit.

B input control 48 is shown in FIG. 17. Gates 1700 interconnect the A, $\overline{A+}$, and $\overline{A-}$ outputs of the A register to the B input of arithmetic unit 40 during left and right shift operations. $I_3$ from the instruction register 33 is decoded for indicating whether a shift operation is to be a right or left shift. As can be seen, gates 1700 are hardwired perform shift operations under a MANT mask. That is the decimal point digit which is received at DT9E is provided automatically from the $\overline{A}$ output while the $\overline{A+}$ output is used for a left shift and the $\overline{A-}$ output is used for a right shift. Gates 1700 are also responsive to the MASK 34 signal. As can be seen from Section D of Table I and FIG. 6e, the $I_3$ bit controlling the detection of the shift also generates a LSD mask during a left shift operation while a right shift signal also generates an OVF mask. However, instead of using the MASK 34 signal to indicate what digits are permitted to go to the arithmetic unit, the MASK 34 is used at gate 1700 to indicate which digits are not permitted to go to the adder, that is, the first digit (LSD MASK) is not permitted to to to the adder during a left shift operation thereby automatically zeroing that digit. Similarly, the most significant digit is zeroed during a right shift by this use of the MASK logic.

Gates 1701 are provided for inputting the contents of register B into the B input of the adder if an arithmetic operation not involving a constant is indicated by the instruction word outputted from ROM 30. Thus, gates 1701 decode A+B type arithmetic operations. Inverter 1703 is used to first invert the $\overline{B}$ output from Register B during subtraction operations when the $I_5$ bit is a logical one.

Gates 1702 are used during an airthmetic operation involving a constant for loading a serialized constant from the $I_5$-$I_8$ bits of the instruction word via serializer 47 when M4 is a logical zero or for loading a constant from the keyboard latches via a serializer 46. Thus, gates 1702 decode A+K type arithmetic operations.

ARITHMETIC UNIT

Figure 18:
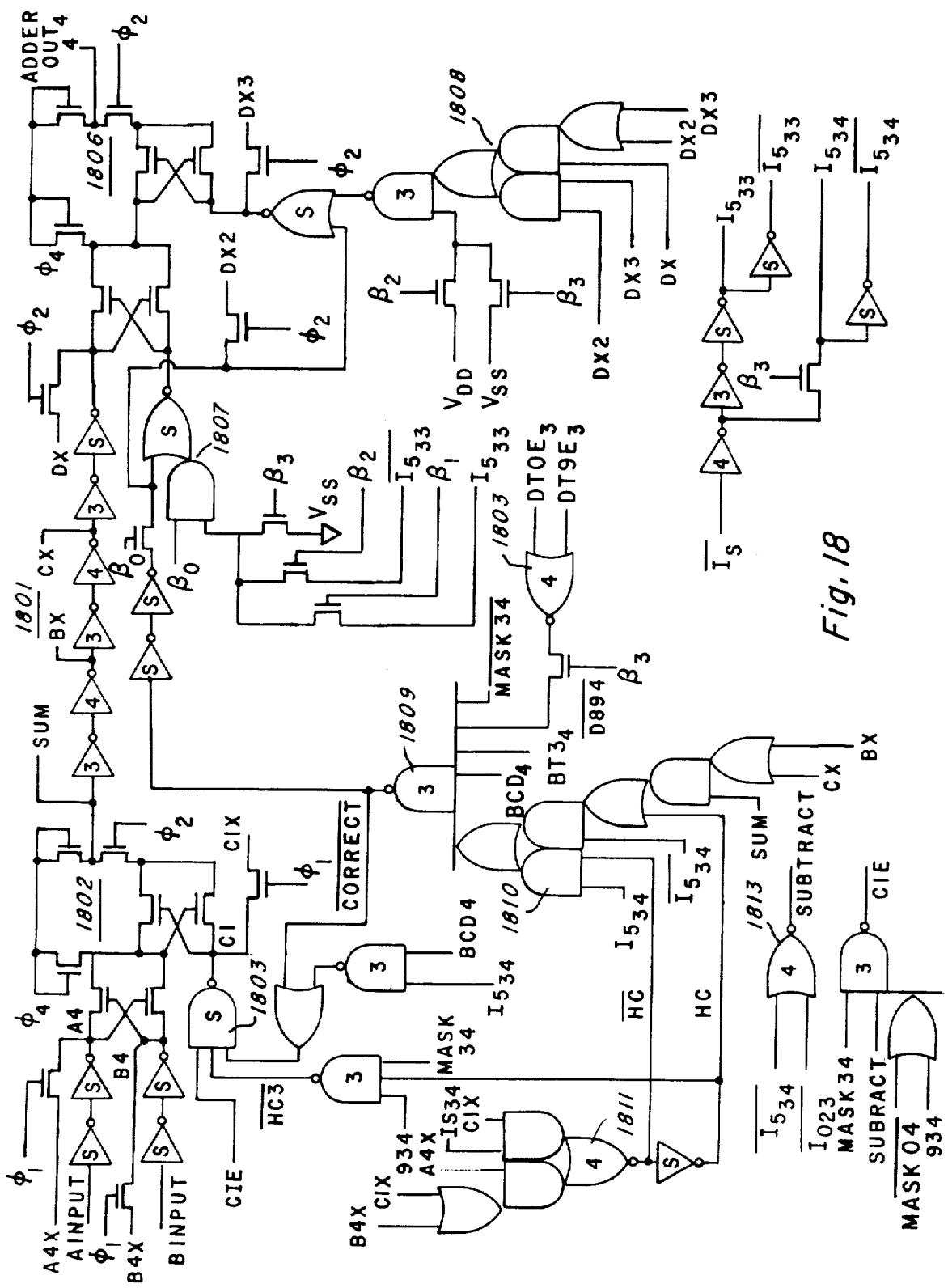
FIG. 18 is a logic diagram of the arithmetic unit.

Arithmetic unit 40 is depicted in FIG. 18. Arithmetic unit 40 is a serial arithmetic unit with inputs labeled A and B and has 3 ½ bits of delay associated therewith. Gates 1802 and 1806 are ratioless full adders using cross coupled MOS type exclusive OR gates arranged in series. Gates 1802 produce a sum output with three inputs (ie, A, B and CARRY) in half a bit of delay. The CARRY bit can come from one or three sources which are provided to gate 1803. One of the sources is CIE generated at gate 1812 which is used to insert a CARRY at the beginning of a MASK when a subtract operation is being done. A CARRY bit is needed at that time according to the twos complement subtraction accomplished in arithmetic unit 40. Gate 1812 has a MASK 34 and a MASK 04 signals which are delayed different amounts by the MASK generator (FIG. 11) and thus NAND gate 1812 is effectively a leading edge detector. Timing signal 934 which goes to gate 1812 is used to block out a CARRY signal over to the next instruction cycle. Gate 1813 is responsive to the $I_5$ and $\overline{I_0}$ bits and is used to generate a SUBTRACT during A-B operations. A second method for producing the CARRY is the hex carry (HC) that is generated by gates 1811 which has its inputs the previous CARRY delayed one bit and the A and B adder inputs. The CARRY generated by gate 1811 is also blocked at $\overline{934}$ by gates 1800 at the very end of instruction cycle to prevent it from carrying into the beginning of a next instruction cycle. The last method of creading a CARRY is with binary coded decimal (BCD) correction. If the result has to be BCD corrected, and it's an addition operation, then a CARRY is forced during a BCD correction during a subtraction operation. Gates 1810 determine whether or not a BCD correction is required by sampling each digit outputted from adder 1802. This is done by sampling the outputs CX, BX and SUM outputted from the shift register 1801 connected at the output of adder 1802. SUM, CX and BX determine whether or not the outputted result is greater than a decimal nine. The $I_5$ bit of the instruction word also goes into gates 1810 to determine whether or not the correction should be done for a subtract or an add. If an addition operation is indicated the condition for correction, $\overline{CORRECT}$, is either a hex carry (HC) or a sum greater than nine. If a subtraction operation is indicated, in which case $I_5$ is a binary one, the condition for generating a CARRY is lack of a hex carry ($\overline{HC}$). Gate 1809, which generates $\overline{CORRECT}$, is responsive to the output from gate 1810, the BCD signal from gate 1208, mask signals and timing signals for determining whether or not a correcting signal should be sent out. Gate 1803 provides a timing signal which inhibits BCD correction during the overflow and decimal point digits which are always operated on in hexadecimal.

Gate 1807 provides the input for the plus six or ten correction factor when the BCD correction is made in the second adder 1806. If an addition operation is indicated ($I_5$ being a binary zero), then a six is added. However, if $I_5$ is a binary one then a subtraction operation is indicated and a plus ten is added in adder 1806. Adder 1806 is responsive to the output of the shift register 1801, to the plus six or plus ten generated at gates 1807 and the previous carry which is generated by gates 1808.

INSTRUCTION REGISTER CONTROL AND BRANCH LOGIC

Figure 19:
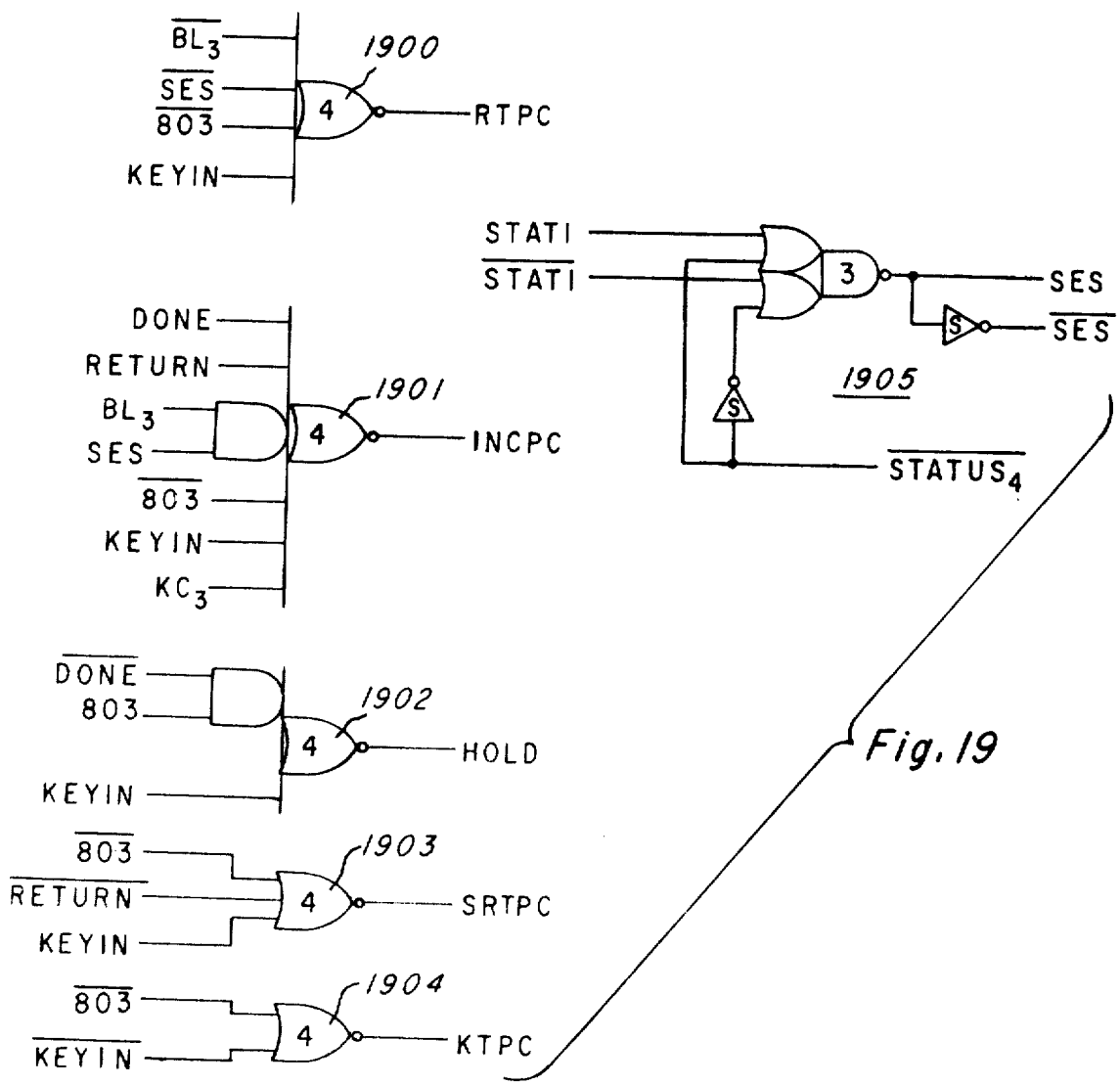
FIG. 19 is a logic diagram of the program counter control which generates control signals for the program counter.
Figure 20:
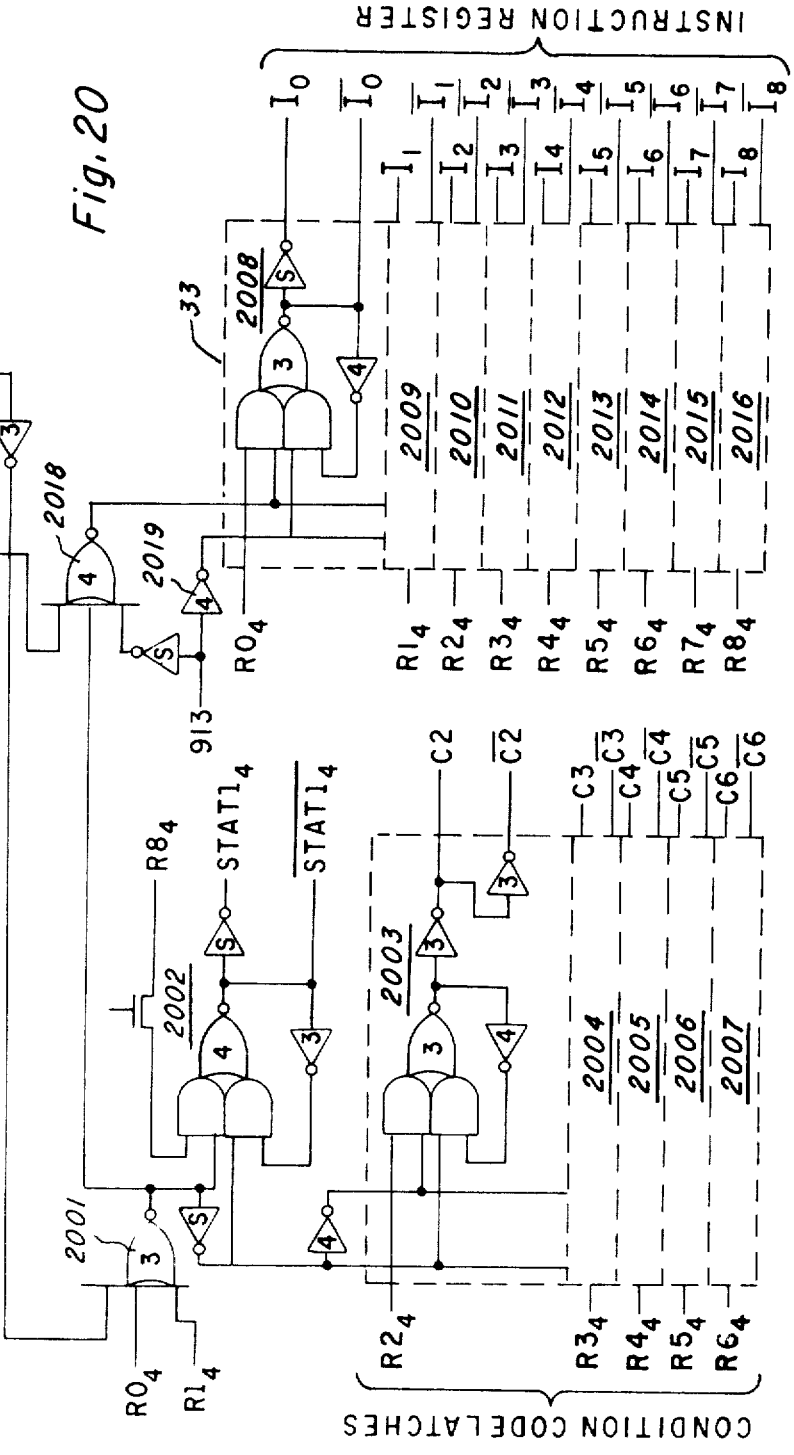
FIG. 20 is a logic diagram of a portion of the calculator's branch logic, the condition code latches, the branch latch, the call latch and the instruction register.
Figure 26:
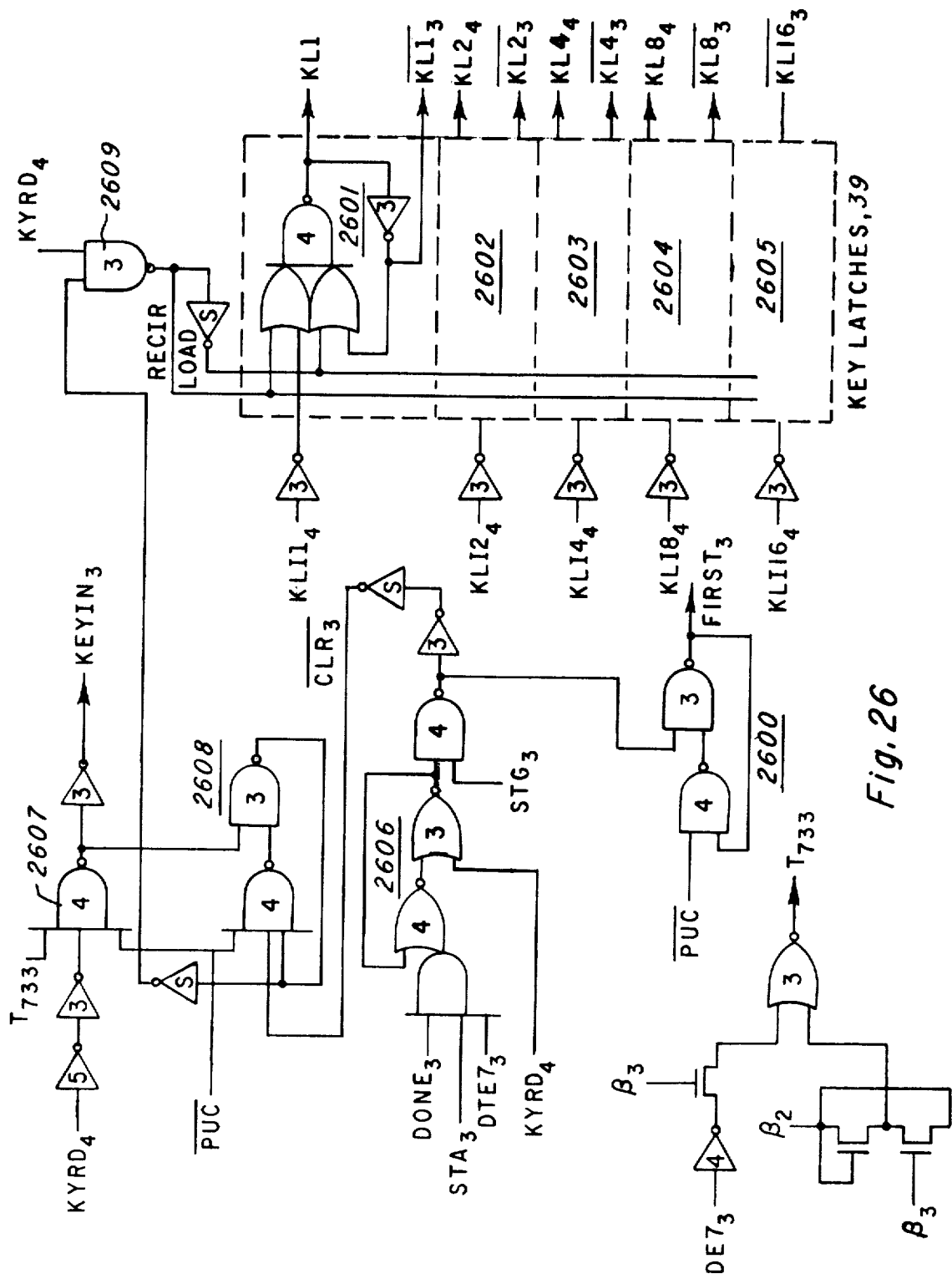
FIG. 26 is a logic diagram of the key latches and debounce logic.

Instruction register control and branch logic are depicted in FIGS. 19, 20 and 21. Branch latch 36, which is formed by gates 2000, is responsive to a decoder branch or call instruction received at NOR gate 2020 for setting the latch for one instruction cycle. The outputs from branch latch 36, BL and $\overline{BL}$, indicate that the next instruction word outputted from ROM 30 is an address word and it is to be decoded as an address and not as an instruction.

Signals RTPC, INCPC, HOLD, SRTPC, and KTPC, which are utilized in the control of program counter 31, and previously discussed with reference to FIGS. 8A and 8B, are generated by gates 1900-1904, respectively. Considering for the moment a branch instruction, which will result in generating the RTPC signal if either (1) the indicated condition is satisfied or (2) it is an unconditional branch, gate 2001 decodes the family of branch instructions (including call, return and done instructions the $R_0$ and $R_1$ bits of the instruction word both being a logical one). Gate 2001 permits a set of condition code latches 2002-2007 to be loaded with the $R_8$ and $R_2$-$R_6$ bits of the instruction word when a branch operation is indicated. Latch 2002 is loaded with the status bit $R_8$, while latches 2003-2007 are loaded with the five bits indicating which condition is to be tested or indicating that the branch is to be made unconditionally (See Section A, Table I). The five bit condition code (COND) loaded into latches 2003-2007 is used to determine which of the possible flags or latches according to Section A of Table I are to be compared with the status bit loaded into latch 2002, for instance. Complex gate 2100 decodes flag 38 or latch 37, 39 or 2600 or (2) no flag or latch if an unconditional branch or call is indicated, to status comparison gate 1905. At gate 1905, which functions as an exclusive or, the content s of the status bit in latch 2002 is compared with the output from complex gate 2100, generating the signal SES, which is a logical one if either an unconditional branch or call has been decoded or a conditional branch has been decoded and the state of the status bit $R_8$ matches the state of the indicated latch or flag. Thus, RTPC is generated by gate 1900 when both $\overline{SES}$ and $\overline{BL}$ indicate the aforementioned conditions have occurred. Conversely, gate 1901 will generate INCPC when the aforementioned conditions have not occurred and no RETURN or DONE instruction is decoded.

FLAGS AND LATCHES

Carry latch 37 is implemented by gates 2101 which are responsive to hex-carry ($\overline{HC}$) from arithmetic unit 40 and to the output of NOR gate 2102. NOR gate 2102 is responsive to mask signals MASK 34 and MASK 03, the latter being inverted by inverter 2103. NOR gate 2103 is arranged as a trailing edge detector circuit, so that carry latch 37 is set whenever a hex-carry is indicated outside the mask during an arithmetic operation.

The live entry (LE), pending (PEND), store (STO). overflow (LOCK), decimal point (DPT), an entry (EN), flags are stored in latches 2200-2205 These flag latches 38 are responsive to the $I_5$ bit for either setting or resetting the latch and the flag latch enabling signals generated by gates 1000, 1001, 1004, 1002, 1003, and 1007, respectively. The operational flags 38 are stored in latches 2300 and 2301 which are responsive to flag latch enabling signals F5 and F6 for (1) resetting both latches 2300 and 2301 in response to decoding a "reset + operation" flag at gate 1005 and (2) resetting latch 2300 upon decoding a "reset $\times$ operation" flag at NAND gate 1006. Further, latches 2300 and 2301 are responsive to a decoded "load operation flag" from NAND gate 1008 for loading latches 2300 and 2301 with the KL4 and KL8 bits from key latches 2603 and 2604.

A first latch 2600, whose contents may be used to condition a branch instruction is implemented in debounce and PUC logic 44. One function of first latch 2600 is subsequently discussed with reference to debounce and PUC logic 44.

INSTRUCTION REGISTER

Instruction Register 33 is implemented as a series of nine latches 2008-2016. These latches are enabled by an enabling signal generated by NOR gate 2018 at time 914 unless (1) branch latch 2000 is set indicating the instruction word is an address or (2) NOR gate 2001 is a logical one indicating a BRANCH, CALL, DONE, or RETURN instruction is being outputted. As has been previously mentioned, instruction register 33 is not loaded with either a branch instruction word or a branch address instruction word thereby eliminating the need for the decoders responsive to the address contained in instruction register 33 from being disabled on such instructions.

Latches 2008-2016 normally recirculate the instruction word stored therein on the phase $\phi3$ and phase $\phi4$ precharge cycles of the NOR gates and inverters in each latch and each latch is automatically zeroed on time signal 914 received from inverter 2019 unless loaded with a new instruction word under control of gate 2018. Thus when either a BRANCH, CALL, DONE, or RETURN instruction word or a branch address instruction word is being decoded, instruction register 33 is automatically loaded with a 000000000 as the instruction word which is treated as a no operation instruction.

As can be seen, NOR gate 2018, branch latch 2000 and NAND gates 902 and 903 cooperate to provide an instruction word decoder logic means responsive to at least a portion of each outputted instruction word for generating the enabling signal, which controls whether or not instruction register 33 is loaded with the outputted instruction word. The decoders used to decode the outputted instruction word are either responsive to the instruction word directly from ROM 30 or the instruction word in register 33 as discussed previously with reference to the instruction word decoder logic.

KEYBOARD PROGRAMMED LOGIC ARRAY, KEYBOARD LATCHES AND INSERTION LOGIC.

The keyboard strobe 42 strobes the keyboard 2 (FIG. 2) at state times STA-STF which are generated on chip by the chip's clock generator system. The periods of these state time signals has been previously discussed with reference to FIGS. 4a and 4b. When a key is depressed, the state time signals STA-STF are communicated to one of four K lines, K1-K4, depending on which key is depressed. The K line inputs to chip 10 (FIG. 2) are buffered by a pair of inverters 2400 and 2401 and are subsequently applied to keyboard programmed logic array (PLA) 41 (FIG. 25). Referring now to FIG. 25, PLA 41 is responsive to the buffered keyboard outputs from inverters 2400 and 2401 and to state times STA-STF from the clock generator system for decoding which one of the keys has been depressed. PLA 41 also outputs, via gate 2500, a key-ready (KYRD) signal indicating that a key has been depressed. PLA 41 outputs a five bit code on lines KLI1, KLI2, KLI4, KLI8, and KLI16 indicating which one of the keys has been depressed. Table III shows the various five bit codes outputted by PLA 41 in response to the key depressions listed. The five bit key codes reading from left to right are stored in latches 2605 through 2601. Of course, the particular five bit codes selected as well as the arithmetic functions performed by the chip are a design choice.

The five bit code outputted from PLA is communicated to the key memory latches 39 formed by five latches 2601-2605. The KYRD signal is an input at NAND gate 2607 which, at time 803, may output a signal called KEYIN. KEYIN is supplied to gate 1904 for forcing the contents of the key latches 39 to be inputted to program counter 31 when KTPC is generated. Upon receiving KYRD signal, the key latches 2601-2605 are loaded from the keyboard PLA 41 and the contents thereof loaded into program counter 31 as been previously discussed with respect to FIG. 8a and 8b.

When the key latches are used to provide the program counter address, the five key latches 2601-2605 are loaded into selected bit locations in program counter 31 as discussed with reference to FIGS. 8a and 8b. If the five bit code in key latches 2601-2605 has a zero in the KLI16 latch, 2605, the program counter address is derived directly from all five key latches 2601-2605. However, when key latch KLI16 is loaded with a logical one (which preferably indicates a numeric key or the decimal point key has been depressed), only the contents of that latch, latch 2605, is loaded into the program counter by the action of gates 2700-2703 which disable the parallel data path between key latches 2601-2604 and program counter 31. This feature of the microprocessor permits numbers to be entered into register A by branching to a single location in ROM 30 and thereat encountering instructions for loading the contents of the key latches directly into register A. The instruction used to transfer the contents of the key latches to Register A is defined in Section G of Table I.

DEBOUNCE LOGIC

Upon receiving the key ready signal KYRD, a key-ready latch 2608 is set which disables gates 2607 and 2609 from receiving another key-ready. Key-ready latch 2608 inhibits the loading of key latches 2601-2605 (and thus program counter 31) until key-ready latch 2608 is reset. Key-ready latch 2608 is reset by CLR from debounce latch 2606 which will reset key-ready latch 2608 only if (1) the DONE instruction at the end of the set of instructions to which the current contents of key latches 2601-2605 caused program counter 31 to increment through has been decoded and (2) the keyboard sees no KYRD signal during the next period comprising state times STA to STG. If those two conditions are satisfied, debounce latch 2606 will permit key-ready latch 2608 to reset which in turn permits gates 2607 and 2609 to receive another key-ready signal for loading the key latches 2601-2605 and program counter 31 in response thereto.

While the debounce latch 2606 is responsive to the decoding of a DONE instruction, which is located at the end of a set of instructions for performing the calculator operation indicated by the key depressed, successful operation of debounce logic is not dependent on the instruction to which debounce latch 2606 is responsive being at the very end of the instruction set. However, the instruction to which debounce latch 2606 is responsive should preferably be toward the end of the set of instructions and is at the end in this embodiment.

A "first" latch 2600 is used in connection with a first latch condition branch instruction word loaded into a read-only-memory 30 for permitting a software power-up clear set of instructions to zero the contents of the memory register, Register M, only the firt time the clear key (c) is depressed. The "first" latch 2600 is set the first time debounce latch 2606 resets key-ready latch 2608. The clear key is initially depressed when the calculator is energized, because the calculator preferably uses a power latch of the type disclosed in U.S. Pat. No. 4,115,705. Thus, the "clear" key and the "on" keys are the same key and only the first depression of the "clear" key will zero the contents of Register M if the power-up clear instruction set makes appropriate use of a branch condition on the state of first latch 2600.

A power-up clear signal, PUC, is generated preferably by a clock generator 51 when the calculator is first energized until the clock phases produced by clock generator 51 have come up to proper voltages.

DISPLAY LOGIC

Figure 28:
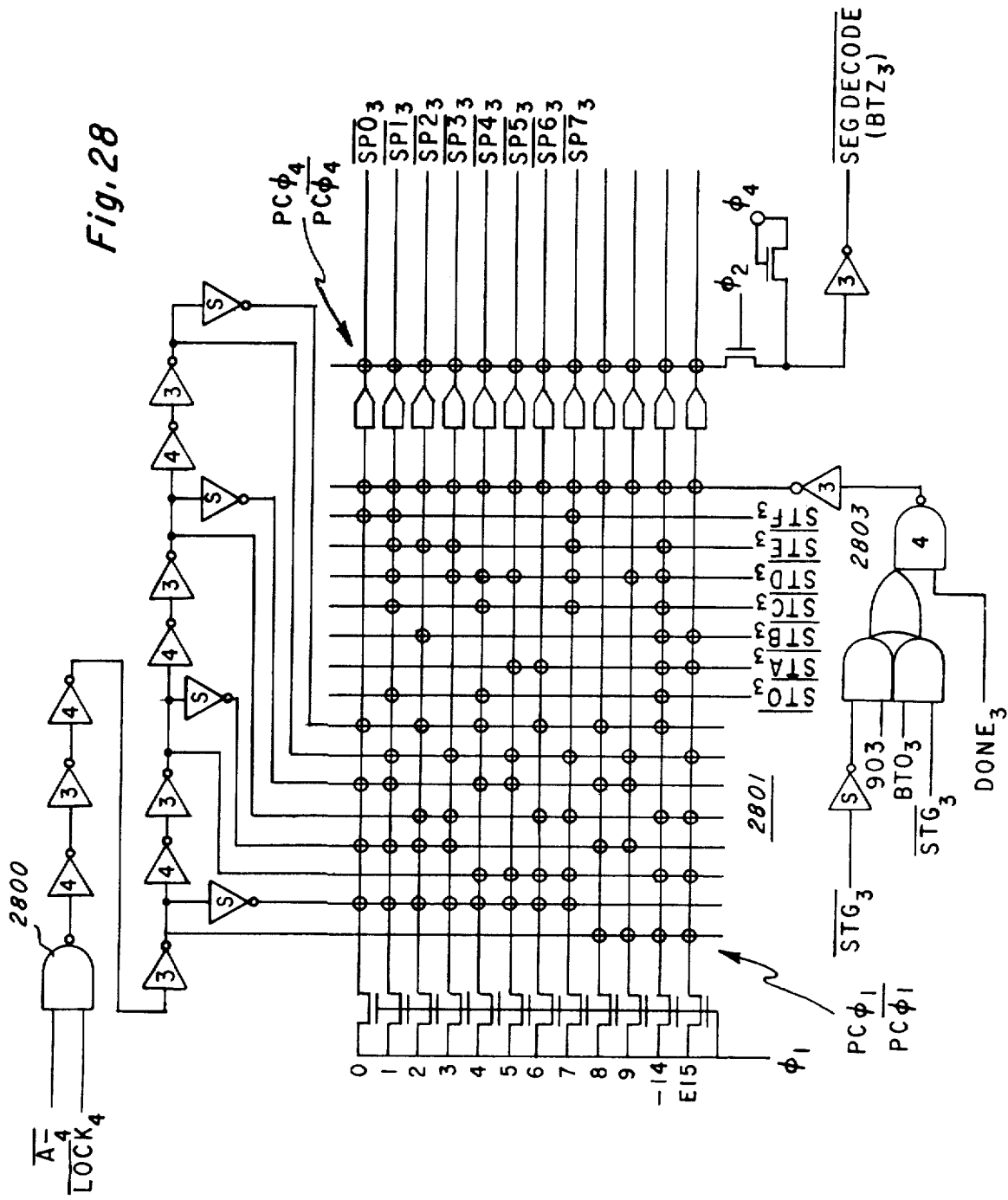
FIGS. 28 and 29 are logic diagrams of the calculator's display system.
Figure 29:
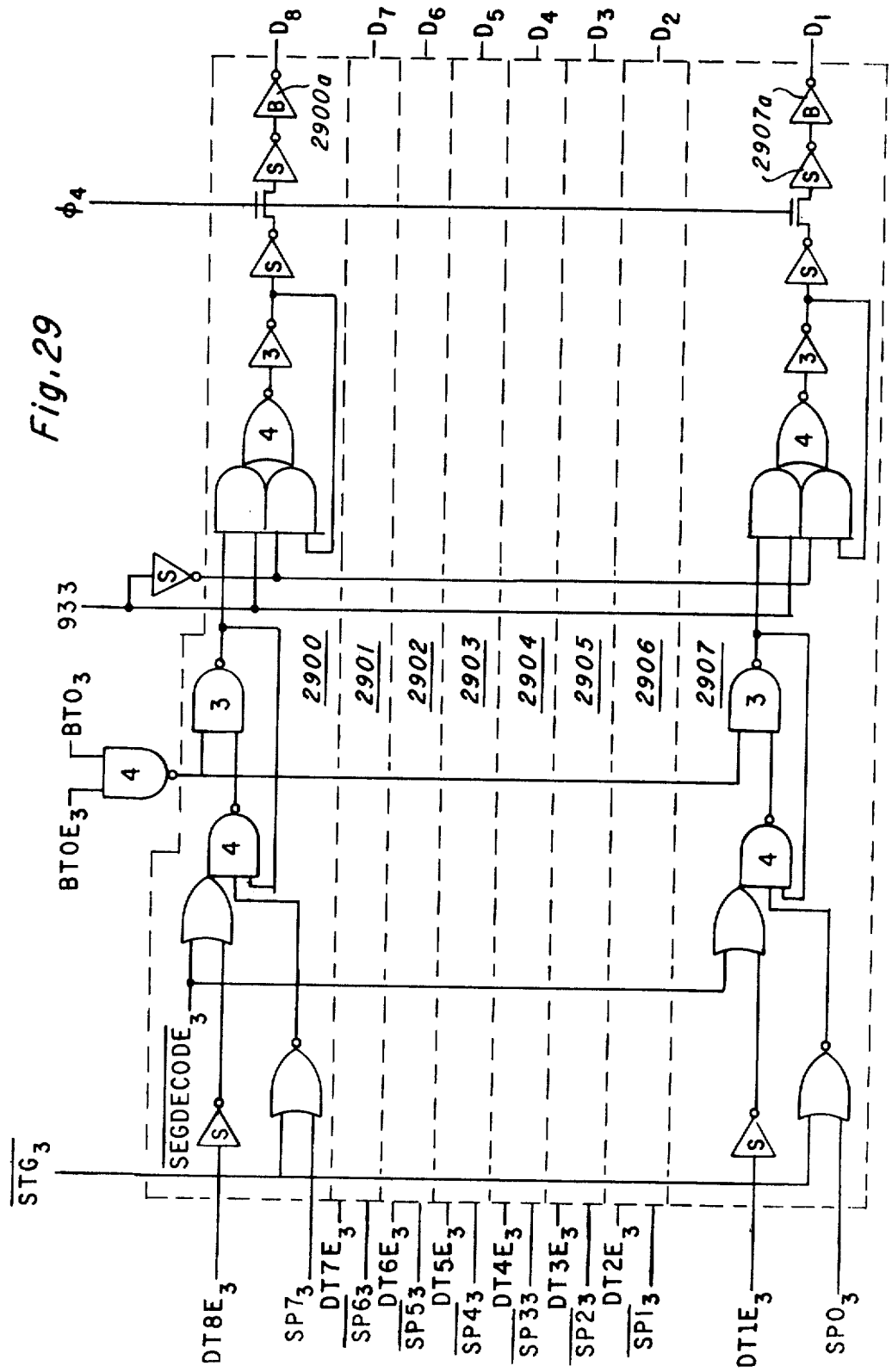

Display logic 52 is depicted in FIG. 28. NAND gate 2800 is responsive to the output from register A and to the contents of the lock flag latch 2203. It should be remembered that the lock flag latch 2203 stores a flag indicating an overflow condition and by means of NAND gate 2800 the error condition indicated by the lock flag is automatically generated at the display. The display system utilizes the segment scanning method of U.S. Pat. No. 4,014,012 and thus the segments of the display are sequentially energized at state times STA-STG and STP while the digit lines are encoded. The encoding function is performed by digit decoder 2801 which is responsive to the output from NAND gate 2800 after being converted from serial to parallel, in true and false logic, by a shift register 2802. Decoder 2801 is also responsive to state times STA-STG and STP and to an enabling signal generated by gates 2803. The eight outputs from decoder 2801, SP0-SP7, are supplied to an eight stage output register, comprising stages 2900-2907. Output register 2900-2907 includes output buffers 2900A-2907A for driving digit lines D1-D8 (FIGS. 2 and 5b).

Having described the invention in connection with a specific embodiment thereof, further modification may now suggest itself to those skilled in the art. For example, it should be evident that the number of bits in a data word or an instruction word, the nominal clock frequency, and the logic levels, as well as other aspects of the disclosed calculator embodiment of the microprocessor system of the present invention, are based on a design device. It should be understood that this invention is not limited to the specific embodiments disclosed, except as set forth in the appended claims.

TABLE I

A. BRANCH INSTRUCTIONS - See FIG. 6(a).

| COND | | | |
|---|---|---|---|
| 00000 | Branch | Unconditionally | (S=0) |
| 00001 | " | on LE flag | |
| 00011 | " | on PEND flag | |
| 00101 | " | on LOCK flag | |
| 00110 | " | on DPT flag | |
| 00111 | " | on STO flag | |
| 01001 | " | on EN flag | |
| 01011 | " | on CARRY LATCH | |
| 10000 | " | on "0" key (key latches) | |
| 10001 | " | on "." key (key latches) | |
| 10100 | " | on X, ÷ operation (OP flags) | |
| 10101 | " | on − operation (OP flags) | |
| 10110 | " | on ÷ operation (OP flags) | |
| 11000 | " | on X, ÷ key (key latches) | |
| 11001 | " | on − key (key latches) | |
| 11010 | " | on ÷ key (key latches) | |
| 11110 | " | on first latch | |
| 4/6 S | | | |
| 0 | Branch on status=0 | | |
| 1 | Branch on status=1 | | |

B. SUBROUTINE AND DONE INSTRUCTIONS - See FIG. 6(b)

| COND | |
|---|---|
| 01010 | DONE |
| 11100 | CALL |
| 11101 | RETURN |

C. ARITHMETIC INSTRUCTIONS i. Reg A plus a constant (A+K) - See FIG. 6(c)

A/φ

| | |
|---|---|
| 1 | Result ignored, Reg A recirculates |
| 0 | Result to Reg A |

M

Mask - See FIG. 5(b)

K

TABLE I-continued 4 bit constant
ii. Reg A and Reg B operations (A±B) - See FIG. 6(d)

__M__
Mask - See FIG. 5(b)

__+/−__
- 0  A+B
- 1  A−B

__A/φ__
- 0  Results to Reg A
- 1  Results ignored, Reg A recirculates

D. SHIFT INSTRUCTIONS - See FIG. 6(e).

__L/R__
- 0  Left shift contents of Reg A within MANT mask
- 1  Right shift contents of Reg A within MANT mask

E. REGISTER INSTRUCTIONS - See FIG. 6(f)

__T/X__
- 0  Transfer operation (A→M means content of A is placed in M and also is recirculated in A)
- 1  Exchange operation (A/M means contents of A and M are exchanged)

__R__
- 000  A→B
- 001  A→C (T/X=0 only)
- 010  C→A
- 100  B→C
- 101  B→D
- 011  M→A
- 110  O→A (Clears Reg A; T/X=0 only)

F. FLAG INSTRUCTIONS - See FIG. 6(g)

__S/R__
- 0  Set Flag
- 1  Reset Flag

__F__
- 000  LE Flag       (F0)
- 001  PEND Flag     (F1)
- 010  LOCK Flag     (F2)
- 011  DPT Flag      (F3)
- 100  STO Flag      (F4)
- 101  Reset + Operation flag (F6)
- 110  Reset × Operation flag (S/R=1 only) (F7)
- 110  Load + and × Operation flags from KB latches (S/R=0 only)
- 111  EN Flag (F8)

G. KEY LATCH TO REGISTER A - See FIG. 6(h)

Contents of key latches are added into Reg A under LSD Mask

TABLE II

| Program Counter Address (in hexidecimal) | INSTRUCTION WORD | Line No. | Dest | MNEMONICS SOURCE | STATEMENT | |
|---|---|---|---|---|---|---|
| 01FF | 0 0001 1111 0000 | 4 | | MERRTN | CALL | |
| 00FF | 0 0000 0001 0110 | 5 | 503 | | PRENMB | |
| 007F | 0 0001 1111 0000 | 6 | | | CALL | |
| 003F | 0 0001 1101 0001 | 7 | 27 | | PUSTNB | |
| 001F | 0 0001 1111 0000 | 8 | | | CALL | |
| 000F | 0 0000 1001 1001 | 9 | 35 | | PUSTN1 | |
| 0107 | 0 0000 0110 0010 | 10 | | | STCA | |
| 0183 | 0 0000 0110 1011 | 11 | | | EXAM | |
| 01C1 | 0 0001 1000 0010 | 12 | | | BRU | |
| 01E0 | 0 0001 0110 0111 | 13 | 76 | | SQRT10 | |
| 00F0 | 0 0001 1111 0000 | 14 | | REVKEY | CALL | YES |
| 0178 | 0 0000 0101 1001 | 15 | 501 | | PMENRM | |
| 01BC | 0 0001 1001 1111 | 16 | | | HSS10 | |
| 01DE | 0 0000 1010 0011 | 17 | 84 | | EXCKEY | |
| 01EF | 0 0000 0110 1000 | 18 | | REVKY1 | EXAB | |
| 01F7 | 0 0001 1000 0010 | 19 | | | BRU | |
| 00FB | 0 0001 0001 1111 | 20 | 23 | | DISPLAY | |
| 0070 | 0 0000 0110 1011 | 21 | | MEMSTO | EXAM | |
| 003E | 0 0000 0110 0011 | 22 | | MEMMCL | STMA | |
| 011F | 0 0000 0101 1111 | 23 | | DISPLAY | REN | |
| 006F | 0 0000 0101 1000 | 24 | | POSTNM | RLE | |
| 0197 | 0 0001 1111 0000 | 25 | | POSTN7 | CALL | |
| 0143 | 0 0000 0001 0110 | 26 | 503 | | PRENMB | |
| 0101 | 0 0000 0110 0001 | 27 | | POSTNB | STAC | |
| 00EA | 0 0000 0101 1100 | 28 | | SAVSGN | RSTO | |
| 0074 | 0 0001 1010 1000 | 29 | | | AKA | OVF,8 | ANS NEG ? |
| 013A | 0 0001 1010 1110 | 30 | | | HSCARRY | NO |
| 019D | 0 0001 0011 0011 | 31 | 34 | | SAVSN1 | |
| 00CE | 0 0000 0101 0100 | 32 | | | SSTO | YES, SET STO FLG |
| 0067 | 0 0000 0010 1000 | 33 | | | AKAA | OVF,8 | ZERO OVF DIGIT |
| 0135 | 0 0001 1111 0100 | 34 | | SAVSN1 | RETURN | |
| 0099 | 0 0000 1011 1000 | 35 | | PUSTN1 | AKA | OPT,8 | FRACTION ? |
| 004C | 0 0001 1010 1110 | 36 | | | HSCARRY | NO |
| 002A | 0 0000 0110 0101 | 37 | 257 | | POSTN2 | NO |
| 0013 | 0 0001 0010 0011 | 38 | | | RSA | YES |
| 0609 | 0 0000 0011 1111 | 39 | | | AKAA | OPT,15 | SHIFT RIGHT, DECR D |
| 0104 | 0 0001 1000 0010 | 40 | | | BRU | |
| 0082 | 0 0000 1001 1001 | 41 | 35 | | POSTN1 | |
|  |  | 42 | | | ORG | *41 | |
| 0041 | 0 0001 1111 0000 | 43 | | SQRT | CALL | |
| 0120 | 0 0000 0101 1001 | 44 | 501 | | PRENRM | |
| 0090 | 0 0000 1010 1000 | 45 | | | AKA | OVF,8 | NEG ARG ? |
| 014A | 0 0001 1010 1111 | 46 | | | HSCARRY | |
| 00A0 | 0 0000 0000 1100 | 47 | 264 | | FRROR | YES |
| 0052 | 0 0000 0110 1010 | 48 | | | EXAC | NO, ARG TO C |
| 0129 | 0 0001 1000 1110 | 49 | | | HRPEND | |
| 013A | 0 0000 1110 0101 | 50 | 52 | | SQRT9 | |
| 01CA | 0 0000 0111 1101 | 51 | | | EXAM | PENDING TO D |
| 00E5 | 0 0000 0110 0000 | 52 | | SQRT9 | STAB | A = 1 |
| 0172 | 0 0000 0001 0001 | 53 | | | AKAA | MSD,1 | A = ANS, B = 1, C = ARG |
| 0140 | 0 0000 0110 1000 | 54 | | | FXAB | A = ANS, B = 1, C = ARG |
| 000C | 0 0000 0011 1111 | 55 | | | AKAA | OPT,11 | INTT DPT ANS = 11 |
| 01BE | 0 0000 0110 1010 | 56 | | SQRT1 | EXAC | |
| 00B7 | 0 0000 0111 0001 | 57 | | | AKAA | OPT,1 | INCR DPT ARG |
| 0054 | 0 0001 1010 1111 | 58 | | | HSCARRY | |
| 0020 | 0 0001 0111 0011 | 59 | 434 | | SQRT3 | EVEN EXP |
| 011A | 0 0000 0011 1001 | 60 | | | AKAA | OPT,1 | |

| | | | | | | |
|---|---|---|---|---|---|---|
| 88 | 0 0001 1010 1111 | 61 | | | RSCARRY | |
| C5 | 0 0000 1110 0111 | 62 | 438 | | SQRT2 | ODD EXP |
| F2 | 0 0000 0110 1010 | 63 | | | EXAC | |
| F1 | 0 0000 0011 1111 | 64 | | | AKAA | DPT,15 DECR OPT ANS |
| 78 | 0 0001 1000 0010 | 65 | | | BRU | |
| 3C | 0 0001 0110 1110 | 66 | 56 | | SQRT1 | |
| 9F | 0 0001 0000 0011 | 67 | | SQRT7 | LSA | |
| CF | 0 0000 0110 1010 | 68 | | | EXAC | |
| 87 | 0 0001 0010 0011 | 69 | | SQRT8 | RSA | |
| F8 | 0 0000 0011 0010 | 70 | | | AKAA | OPT,2 |
| 1F9 | 0 0000 0110 1010 | 71 | | | EXAC | |
| 17C | 0 0001 1010 1110 | 72 | | | BRCARRY | |
| 3F | 0 0000 1011 1001 | 73 | 440 | | SQRT8 | |
| 9F | 0 0000 0110 0110 | 74 | | | CLRA | |
| 3CF | 0 0000 0110 1000 | 75 | | | EXAB | |
| 167 | 0 0001 1000 1110 | 76 | | SQRT10 | BRPEND | |
| 193 | 0 0001 0001 1111 | 77 | 23 | | DISPLAY | |
| 109 | 0 0000 0110 1101 | 78 | | | EXRD | |
| 36C | 0 0001 1000 0010 | 79 | | | BRU | |
| 136 | 0 0001 0001 1111 | 80 | 23 | | DISPLAY | |
| 11B | 0 0000 0110 1011 | 81 | | MEMCLR | EXAM | MEMORY CLEAR KEY |
| 380 | 0 0000 0110 0110 | 82 | | MEMCL1 | CLRA | |
| 146 | 0 0000 0011 0111 | 83 | | | AKAA | OPT,7 |
| 3A3 | 0 0000 0110 1011 | 84 | | EXCKEY | EXAM | |
| 151 | 0 0001 1000 0010 | 85 | | | BRU | |
| 0AB | 0 0001 0001 1111 | 86 | 23 | | DISPLAY | |
| | | 87 | | | ORG | >50 CE/C/ON OI INSTRU |
| | | | | | | POWER-UP AND CLEAR MEMORY |
| 150 | 0 0001 1111 1011 | 88 | | POWER | BSTEST | |
| 2A | 0 0001 1100 0100 | 89 | 95 | | CECKEY | |
| 105 | 0 0000 0101 1000 | 90 | | | RLE | |
| 143 | 0 0000 0101 1100 | 91 | | | RSTO | |
| 125 | 0 0000 0110 0110 | 92 | | | CLRA | |
| 112 | 0 0000 0011 0111 | 93 | | | AKAA | OPT,7 |
| 1A2 | 0 0000 0110 1011 | 94 | | | EXAM | |
| 1C4 | 0 0001 1001 1111 | 95 | | CECKEY | BSSTO | |
| 142 | 0 0001 0001 1011 | 96 | 81 | | MEMCLR | |
| 171 | 0 0000 0110 0110 | 97 | | NEWNUM | CLRA | CE/C KEY |
| 154 | 0 0000 0011 0111 | 98 | | | AKAA | OPT,7 |
| 11C | 0 0000 0110 0001 | 99 | | | STAC | |
| 1ME | 0 0001 1000 0111 | 100 | | | RSLE | |
| 3C7 | 0 0000 1011 0110 | 101 | 106 | | LEKEY | |
| 163 | 0 0000 0110 0000 | 102 | | | STAB | CLEAR A, B, D |
| 181 | 0 0000 0110 0101 | 103 | | | STBD | |
| 00A | 0 0000 0101 1101 | 104 | | | SADF | |
| 1AC | 0 0000 0101 1001 | 105 | | | BPEN | |
| 0A6 | 0 0000 0101 1011 | 106 | | CEKEY | RDPT | |
| 15A | 0 0000 0101 1110 | 107 | | | RLOC | |
| 1AD | 0 0000 0101 1111 | 108 | | | REN | |
| 156 | 0 0000 0101 1100 | 109 | | | RSTO | |
| 1AH | 0 0000 0101 1000 | 110 | | | RLE | |
| 105 | 0 0001 1000 0010 | 111 | | | BRU | |
| 0EA | 0 0001 0101 0100 | 112 | 169 | | POSTN3 | |
| 075 | 0 0001 0000 0011 | 113 | | DIVID3 | LSA | SHIFT MSD OF A TO OVF |
| 03A | 0 0000 0110 1010 | 114 | | | EXAC | |
| 11D | 0 0000 0011 0010 | 115 | | | AKAA | DPT,2 |
| 08F | 0 0001 1010 1111 | 116 | | | BSCARRY | |
| 047 | 0 0001 0100 0010 | 117 | 205 | | MLDVEX | |
| 123 | 0 0001 0000 0011 | 118 | | | LSA | NO, SHIFT ANS LEFT |
| 191 | 0 0001 1000 0010 | 119 | | | BRU | |
| 0CA | 0 0000 1011 1110 | 120 | 365 | | DIVID2 | |
| 064 | 0 0001 0011 1110 | 121 | | ALGND1 | SAB | OPT EXP A .GE. EXP B |
| 052 | 0 0000 0110 1000 | 122 | | | EXAB | |
| 119 | 0 0001 1010 1111 | 123 | | | BSCARRY | |
| 08C | 0 0000 1111 0110 | 124 | 182 | | ALGND2 | EXP EQUAL |
| 00A | 0 0001 0010 0011 | 125 | | | RSA | EXP A .GT. EXP B, SHIFT A |
| 023 | 0 0000 0011 1111 | 126 | | | AKAA | OPT,15 |
| 111 | 0 0001 1000 0010 | 127 | | | BRU | |
| 0BB | 0 0000 0101 1101 | 128 | 345 | | ALGNDP | |
| | | 129 | | | ORG | >44 X 2 INSTRU |
| 044 | 0 0001 1000 0010 | 130 | | | BRU | |
| 022 | 0 0000 0010 0000 | 131 | 143 | | PERCNT | |
| | | 132 | | | ORG | >11 HEX 2 INSTRU |
| 011 | 0 0001 1000 0010 | 133 | | | BRU | |
| 00B | 0 0000 1111 0000 | 134 | 14 | | REVKEY | |
| | | 135 | | | ORG | >4 . 2 INSTRU |
| 004 | 0 0001 1000 0010 | 136 | | | BRU | |
| 002 | 0 0000 0101 1001 | 137 | 501 | | PRENRM | |
| | | 138 | | | ORG | >1 STO 63 INSTRU |
| 001 | 0 0001 1001 0111 | 139 | | MEMSET | BSLOCK | |
| 100 | 0 0001 1101 1000 | 140 | 180 | | FINISH | |
| 0B0 | 0 0000 0101 0100 | 141 | | | SSTO | |
| 040 | 0 0001 1010 1000 | 142 | | | DONE | |
| 02C | 0 0001 1111 0000 | 143 | | PERCNT | CALL | |
| 010 | 0 0000 0101 1001 | 144 | 501 | | PRENRM | |
| 108 | 0 0000 0011 0010 | 145 | | | AKAA | OPT,2 |
| 0A4 | 0 0001 1010 1110 | 146 | | | BRCARRY | |
| 042 | 0 0001 1000 1000 | 147 | 150 | | PERC2 | |
| 021 | 0 0000 0110 0110 | 148 | | PERC1 | CLRA | |
| 110 | 0 0000 0011 0111 | 149 | | | AKAA | OPT,7 |
| 188 | 0 0000 1011 0001 | 150 | | PERC2 | AKA | OPT,1 |
| 0C4 | 0 0001 1010 1111 | 151 | | | BSCARRY | |
| 062 | 0 0000 0010 0001 | 152 | 148 | | PERC1 | |
| 031 | 0 0001 1000 1110 | 153 | | | BRPEND | |
| 018 | 0 0001 0001 1111 | 154 | 23 | | DISPLAY | |
| 10C | 0 0001 1101 0011 | 155 | | | BSMD | |
| 086 | 0 0001 0001 1111 | 156 | 23 | | DISPLAY | |
| 043 | 0 0000 0110 0101 | 157 | | | STBD | |
| 121 | 0 0001 1111 0000 | 158 | | | CALL | |
| 190 | 0 0001 0101 1000 | 159 | 354 | | MLDVBN | |
| 1C4 | 0 0001 1111 0000 | 160 | | | CALL | |
| 1E4 | 0 0001 1101 0000 | 161 | 486 | | MULTP2 | |

```
0072  0 0000 0110 1101   162          PERCT3    EXRD
0139  0 0000 0110 0101   163                    STRD
009C  0 0001 1000 0010   164                    BRU
014F  0 0001 0001 1111   165    23              DISPLAY
00A7  0 0001 0010 0011   166          POSTN4    RSA                    NO, SHIFT RIGHT, DECR DPT
0153  0 0000 0011 1111   167                    AKAA      DPT,15
0049  0 0000 0001 1101   168                    AKAA      MSD,13       INSERT BLANK
0154  0 0000 1011 1111   169          POSTN3    AKA       DPT,15       NO, DPT LOC = 0 ?
01AA  0 0001 1010 1110   170                    BRCARRY
00D5  0 0001 0000 1101   171    175             POSTN5                 YES, FINISHED
006A  0 0000 1000 1111   172                    AKA       LSD,15       NO, CHK LSD > 0 ?
0055  0 0001 1010 1110   173                    BRCARRY
001A  0 0000 1010 0111   174    166             POSTN4                 NO
0100  0 0001 1001 1110   175          POSTN5    RRSTO
01B6  0 0001 1011 0000   176    179             POSTN6
00CA  0 0000 0010 1000   177                    AKAA      OVF,8
0151  0 0000 0101 1100   178          ERROR1    RSTO
01B0  0 0001 1111 0100   179          POSTN6    RETURN
010A  0 0001 1010 1000   180          FINISH    DONE                   *********
01EC  0 0000 0101 1000   181          ALGND8    RLE
00FA  0 0001 1001 1011   182          ALGND2    RSDPT                  1ST NEG ?
0174  0 0000 1100 0101   183    285             ALGND5                 YES
00BD  0 0001 1000 0111   184                    RSLE                   NO, 2ND NEG ?
005F  0 0000 0101 1000   185    286             ALGND6                 YES
012F  0 0001 0111 0010   186          ALGND3    AABA      MANT         BOTH POS OR BOTH NEG
0197  0 0000 1010 1111   187                    AKA       OVF,15
00CH  0 0001 1010 1110   188                    BRCARRY                CARRY ?
0165  0 0001 0011 1011   189    194             ALGND4                 NO
0142  0 0001 0010 0011   190                    RSA                    YES, SHIFT AND DECR DPT
0109  0 0000 0011 1111   191                    AKAA      DPT,15
00ED  0 0001 1010 1110   192                    BRCARRY                OVERFLOW ?
0076  0 0000 0000 1100   193    264             ERROR                  YES
0138  0 0001 1000 0111   194          ALGND4    RSLE                   NO, GET SIGN OF ANS
0090  0 0001 1101 0010   195    293             ALGND7
004E  0 0001 1000 0010   196                    BRU
0027  0 0001 1110 1001   197    294             ALGND8
                          198                   ORG       >51          MEMRCL 2 INSTRU
0051  0 0001 1000 0010   199                    BRU
002B  0 0000 0011 1110   200    22              MEMRCL
                          201                   ORG       >14          +/- 66 INSTRU
0014  0 0000 0010 1000   202          CHGSGN    AKAA      OVF,8        +/- KEY
0104  0 0001 1000 0010   203                    BRU
0085  0 0001 0100 0111   204    25              POSTN7
0142  0 0001 0010 1100   205          MLDVEX    EXCB
0041  0 0001 0011 0010   206                    AAHA      DPT          A = EXP 1ST
0150  0 0000 0110 1010   207          MLDVX1    EXAC
01AA  0 0000 1011 1001   208                    AKA       DPT,9
00D4  0 0001 1010 1111   209                    BSCARRY
016A  0 0001 0111 1110   210    220             MLDVX3
00B5  0 0000 0011 0001   211                    AKAA      DPT,1        2ND < 7
005A  0 0000 0110 1010   212                    EXAC
0120  0 0001 1001 1011   213                    RSDPT
0196  0 0001 0010 0110   214    227             MLDVX4
01C4  0 0000 0011 1111   215          MLDVX2    AKAA      DPT,15       DECR 2ND
01E5  0 0001 1010 1111   216                    BSCARRY
01F2  0 0001 0101 0000   217    207             MLDVX1
01F9  0 0001 1000 0010   218                    BRU
00FC  0 0000 0000 1100   219    264             ERROR
017E  0 0000 1011 1000   220          MLDVX3    AKA       DPT,8
01BF  0 0001 1010 1110   221                    BRCARRY
000F  0 0001 1101 0111   222    454             MLDVX5                 2ND = 7
0065  0 0000 0011 1111   223                    AKAA      DPT,15       2ND > 7, DECR
0157  0 0000 0110 1010   224                    EXAC
0094  0 0001 1001 1011   225                    RSDPT
0095  0 0001 1100 1011   226    215             MLDVX2
012A  0 0000 0011 0001   227          MLDVX4    AKAA      DPT,1
0093  0 0001 1010 1111   228                    BSCARRY
0049  0 0001 1010 0100   229    233             MLDVX7
0120  0 0000 1011 0101   230                    AKA       DPT,1
0092  0 0001 1010 1110   231                    BRCARRY
0149  0 0001 0101 0000   232    207             MLDVX1
01AB  0 0000 0110 0110   233          MLDVX7    CLRA
0002  0 0000 0011 1111   234                    AKAA      DPT,7
0169  0 0001 1000 0010   235                    BRU
01BD  0 0001 0011 1011   236    194             ALGND4
010A  0 0000 1001 0010   237          NUMBR2    AKA       MSD,2        NUMBER 0-9, IS MSD MINUS ?
01ED  0 0001 1010 1111   238                    BSCARRY                YES
01F6  0 0001 1101 1000   239    180             FINISH
01FA  0 0000 1001 0110   240                    AKA       MSD,6        NO, NUMBER ?
00FD  0 0001 1010 1110   241                    BRCARRY
007F  0 0001 1101 1000   242    180             FINISH                 YES
013F  0 0001 1111 0000   243                    CALL
009F  0 0000 1110 1000   244    28              SAVSGN
000F  0 0001 0000 0011   245                    LSA                    OK, SHIFT AND INSERT
0127  0 0001 0000 0011   246                    LSA
0195  0 0001 0010 0011   247                    RSA
00C9  0 0000 0100 0001   248                    RLA
0164  0 0001 1001 1110   249                    RRSTO
00A2  0 0000 0101 0110   250    253             NUMBR3
0159  0 0000 0010 1000   251                    AKAA      OVF,8
00AE  0 0000 0101 1100   252                    RSTO
0056  0 0001 1001 1010   253          NUMBR3    HRDPT                  DPT SET ?
0124  0 0001 1101 1000   254    180             FINISH                 NO
0195  0 0000 0011 0001   255                    AKAA      DPT,1        YES, INCR DPT
00CA  0 0001 1010 1000   256                    DONE
0065  0 0001 1001 1110   257          POSTN2    RRSTO                  CHK NEG FLG
0152  0 0001 0101 0100   258    169             POSTN3
0199  0 0000 0010 1110   259                    AKAA      OVF,14       INSERT LEADING MINUS
00CC  0 0001 0010 0011   260                    RSA                    SHIFT RIGHT, DECR DPT
0066  0 0000 0011 1111   261                    AKAA      DPT,15
```

| | | | | | | |
|---|---|---|---|---|---|---|
| 0034 | 0 0001 1010 1111 | 262 | | | HSCARRY | OVERFLOW ? |
| 0014 | 0 0001 0101 0100 | 263 | 169 | | POSTN3 | NO |
| 000C | 0 0000 0101 0010 | 264 | | ERROR | SLOC | |
| 0008 | 0 0000 0101 1000 | 265 | | | RLE | |
| 0004 | 0 0001 1000 0010 | 266 | | | BRU | |
| 0101 | 0 0001 0110 0001 | 267 | 178 | | ERROR1 | |
| | | 268 | | | ORG | >180   0=9,, 123 INSTRU |
| 01A0 | 0 0001 1001 0111 | 269 | | NUMBER | HSLOCK | |
| 00C0 | 0 0001 1101 1000 | 270 | 180 | | FINISH | |
| 0060 | 0 0001 1001 1111 | 271 | | | HSSTO | |
| 0030 | 0 0000 1100 0110 | 272 | 275 | | NUMBR4 | |
| 0118 | 0 0001 1000 0111 | 273 | | | BSLE | NEW ENTRY ? |
| 018C | 0 0001 0101 0111 | 274 | 344 | | NUMBR1 | NO |
| 00C6 | 0 0001 0101 0000 | 275 | | NUMBR4 | SLE | YES |
| 0063 | 0 0001 1100 0011 | 276 | | | BSKO | LEADING ZERO ? |
| 0131 | 0 0000 0111 0001 | 277 | 97 | | NEWNUM | YES, DONT ACCEPT |
| 009A | 0 0001 1111 0000 | 278 | | | CALL | |
| 014C | 0 0000 0111 0001 | 279 | 97 | | NEWNUM | |
| 0046 | 0 0000 0101 0000 | 280 | | | SLE | |
| 0053 | 0 0001 1100 0111 | 281 | | | HSKP | OPT KEY ? |
| 0029 | 0 0001 0101 0101 | 282 | 390 | | OPTKEY | YES |
| 0114 | 0 0000 0100 0001 | 283 | | | RLA | |
| 018A | 0 0001 1010 1000 | 284 | | | DONE | |
| 00C5 | 0 0001 1000 0111 | 285 | | ALGND5 | BSLE | 1ST NEG, 2ND NEG ? |
| 0162 | 0 0001 0010 1111 | 286 | 186 | | ALGND3 | YES |
| 0041 | 0 0000 0110 1000 | 287 | | | EXAB | 1ST NEG, 2ND POS |
| 005A | 0 0001 0111 1110 | 288 | | ALGND6 | SAB | MANT |
| 012C | 0 0001 1010 1111 | 289 | | | BSCARRY | SUBT OK |
| 0096 | 0 0000 1100 1101 | 290 | 498 | | ALGND9 | |
| 0144 | 0 0000 0110 1000 | 291 | | | EXAB | |
| 0145 | 0 0001 0111 1010 | 292 | | | SABA | MANT |
| 0102 | 0 0000 0010 1000 | 293 | | ALGND7 | AKAA | OVF,8 |
| 01E9 | 0 0001 1111 0100 | 294 | | ALGND8 | RETURN | |
| 01F4 | 0 0001 1000 0010 | 295 | | | BRU | |
| 01FA | 0 0001 0101 0010 | 296 | 409 | | OPRRTN | |
| 01F0 | 0 0000 1001 0110 | 297 | | PRENM2 | AKA | MSD,6 |
| 00FE | 0 0001 1010 1111 | 298 | | | BSCARRY | MSD > 9 ? |
| 017F | 0 0000 0111 1011 | 299 | 513 | | PRENM1 | |
| 00AF | 0 0001 1001 0110 | 300 | | | BRLOCK | |
| 005F | 0 0001 0001 0111 | 301 | 303 | | PRENM5 | |
| 002F | 0 0000 0010 1000 | 302 | | | AKAA | OVF,8 |
| 0117 | 0 0000 0101 1010 | 303 | | PRENM5 | RLOC | |
| 004H | 0 0000 0110 0001 | 304 | | PRENM4 | STAC | |
| 0145 | 0 0000 0110 0110 | 305 | | PRENM7 | CLRA | CLEAR C |
| 01A2 | 0 0000 0110 1010 | 306 | | | EXAC | |
| 0001 | 0 0001 1111 0100 | 307 | | | RETURN | |
| 006B | 0 0001 1001 1111 | 308 | | | BSSTO | |
| 0034 | 0 0000 0111 1101 | 309 | 21 | | MEMSTO | |
| 011A | 0 0001 1000 1111 | 310 | | | HSPEND | OP PENDING ? |
| 01B0 | 0 0000 1011 1000 | 311 | 315 | | EQUAL2 | YES |
| 01CA | 0 0000 0110 1101 | 312 | | | EXRD | NO, CONSTANT |
| 00E5 | 0 0001 1000 0010 | 313 | | | BRU | |
| 0171 | 0 0001 0101 1100 | 314 | 318 | | EQUAL3 | |
| 008B | 0 0000 0110 1000 | 315 | | EQUAL2 | EXAB | |
| 015C | 0 0000 0110 0101 | 316 | | EQUAL3 | STRD | |
| 01AF | 0 0000 0110 1000 | 317 | | | EXAB | |
| 0007 | 0 0000 0101 1001 | 318 | | OPRKY2 | HPEN | |
| 006B | 0 0001 1101 0011 | 319 | | OPRKY3 | BSMD | |
| 0135 | 0 0001 0101 1000 | 320 | 354 | | MLDVSN | |
| 009A | 0 0001 1101 0110 | 321 | | | PRSUB | |
| 0140 | 0 0000 1101 0011 | 322 | 324 | | ADD | |
| 01A6 | 0 0000 0010 1000 | 323 | | SUBT | AKAA | OVF,8   CHG SIGN OF 2ND FOR SUBT |
| 0005 | 0 0001 0101 1000 | 324 | | ADD | RLE | |
| 0069 | 0 0001 0101 1011 | 325 | | | RDPT | |
| 0134 | 0 0001 1010 1000 | 326 | | | AKA | OVF,8   2ND OPR NEG ? |
| 0194 | 0 0001 1010 1110 | 327 | | | BRCARRY | |
| 01CD | 0 0000 0111 1001 | 328 | 331 | | SIGNS | NO |
| 01E6 | 0 0001 0101 0000 | 329 | | | SLE | YES, ZERO OVF, SET LE FLG |
| 00F3 | 0 0000 0010 1000 | 330 | | | AKAA | OVF,8 |
| 0079 | 0 0000 0110 1000 | 331 | | SIGNS | EXAB | A = 1ST, B = 2ND |
| 005C | 0 0000 1010 1000 | 332 | | | AKA | OVF,8   1ST OPR NEG ? |
| 011E | 0 0001 1010 1110 | 333 | | | BRCARRY | |
| 01AF | 0 0001 1111 0001 | 334 | 337 | | CHKZRO | NO |
| 01C7 | 0 0001 0101 0011 | 335 | | | SOPT | YES, ZERO OVF, SET OPT FLG |
| 01E3 | 0 0000 0010 1000 | 336 | | | AKAA | OVF,8 |
| 01F1 | 0 0001 1001 1111 | 337 | | CHKZRO | AKA | MSD,15   1ST = 0 ? |
| 00FA | 0 0000 0110 1000 | 338 | | | EXAB | NO, 2ND = 0 ? |
| 017C | 0 0001 1010 1110 | 339 | | | BRCARRY | |
| 01AF | 0 0001 0010 1111 | 340 | 186 | | ALGND3 | |
| 01DF | 0 0000 1001 1111 | 341 | | | AKA | MSD,15 |
| 00FF | 0 0000 0110 1000 | 342 | | | EXAB | |
| 0177 | 0 0001 1010 1110 | 343 | | | BRCARRY | |
| 00BD | 0 0001 1110 1100 | 344 | 181 | | ALGNDR | YES |
| 0050 | 0 0001 0011 1110 | 345 | | ALGNDP | SAB | OPT   NO, ALIGN DECIMAL POINTS |
| 002F | 0 0000 0110 1000 | 346 | | | EXAB | |
| 0017 | 0 0001 1010 1111 | 347 | | | BSCARRY | |
| 0008 | 0 0000 0110 0100 | 348 | 121 | | ALGND1 | |
| 0105 | 0 0001 0010 0011 | 349 | | | RSA | EXP B .GT. EXP A, SHIFT B |
| 01B2 | 0 0000 0011 1111 | 350 | | | AKAA | OPT,15   DECR OPT |
| 00C1 | 0 0000 0110 1000 | 351 | | | EXAB | |
| 0160 | 0 0001 1000 0010 | 352 | | | BRU | |
| 0080 | 0 0000 0101 1101 | 353 | 345 | | ALGNDP | |
| 015A | 0 0001 0101 1000 | 354 | | MLDVSN | RLE | SET LE FLG IF OPP SIGNS |
| 01AC | 0 0000 0101 1011 | 355 | | | RDPT | |
| 0006 | 0 0001 0010 0010 | 356 | | | AAHA | OVF |
| 0168 | 0 0001 1010 1111 | 357 | | | AKA | OVF,15 |
| 0185 | 0 0001 1010 1110 | 358 | | | BRCARRY | |
| 00DA | 0 0001 1101 1011 | 359 | 362 | | MLDVS1 | |
| 0160 | 0 0000 0101 0000 | 360 | | | SLE | |
| 01B6 | 0 0000 0010 1000 | 361 | | | AKAA | OVF,8 |

| Hex | Binary | Line | Ref | Label | Op | Arg | Comment |
|---|---|---|---|---|---|---|---|
| 01DB | 0 0000 0111 1000 | 362 | | MLDVS1 | EXAB | | |
| 00ED | 0 0001 0000 0011 | 363 | | | LSA | | |
| 0176 | 0 0001 0010 0011 | 364 | | | RSA | | |
| 01BB | 0 0000 0110 1000 | 365 | | | EXAB | | |
| 00DD | 0 0001 1111 0100 | 366 | | | RETURN | | |
| 006E | 0 0001 1101 1010 | 367 | | | MRDIV | | |
| 0037 | 0 0001 1101 0000 | 368 | 486 | | MULTP2 | | |
| 001B | 0 0000 0101 0011 | 369 | | DIVIDE | SOPT | | |
| 0000 | 0 0000 1001 1111 | 370 | | | AKA | MSC,15 | DIVISOR = 0 ? |
| 0106 | 0 0001 1010 1110 | 371 | | | BRCARRY | | |
| 0003 | 0 0000 0000 1100 | 372 | 264 | | ERROR | | |
| 0141 | 0 0000 0111 1000 | 373 | | | EXAB | | DIVIDEND TO A, DIVISOR TO B |
| 01A0 | 0 0001 0111 1110 | 374 | | | SAB | MANT | |
| 00D0 | 0 0001 1010 1111 | 375 | | | BBCARRY | | |
| 016B | 0 0001 1010 1101 | 376 | 379 | | DIVID1 | | |
| 00B4 | 0 0001 0000 0011 | 377 | | | LSA | | |
| 015A | 0 0000 0011 0001 | 378 | | | AKAA | DPT,1 | |
| 01A0 | 0 0001 0111 1110 | 379 | | DIVID1 | SAB | MANT | |
| 0106 | 0 0001 1010 1110 | 380 | | | BRCARRY | | |
| 01EB | 0 0000 0111 0101 | 381 | 113 | | DIVID3 | | SORT FAILED |
| 01F5 | 0 0001 0111 1010 | 382 | | | SABA | MANT | |
| 00FA | 0 0000 0110 1010 | 383 | | | EXAC | | |
| 0170 | 0 0000 0000 0001 | 384 | | | AKAA | LSD,1 | INCREMENT ANS |
| 00BE | 0 0000 0110 1010 | 385 | | DIVID2 | EXAC | | |
| 015F | 0 0001 1000 0010 | 386 | | | BRU | | |
| 00AF | 0 0001 1010 1101 | 387 | 379 | | DIVID1 | | |
| 0157 | 0 0001 1100 0110 | 388 | | NUMBR1 | BRKP | | |
| 00AB | 0 0001 1101 1010 | 389 | 237 | | NUMBR2 | | |
| 0155 | 0 0000 0101 0011 | 390 | | OPTKEY | SOPT | | |
| 00AA | 0 0001 1010 1000 | 391 | | | DONE | | |
| | | 392 | | | ORG | | |
| 0055 | 0 0001 1000 0010 | 393 | | | BRU | >55 | DIVIDE 2 INSTRU |
| 002A | 0 0000 0000 0101 | 394 | 399 | | OPRKEY | | |
| | | 395 | | | ORG | | |
| 0015 | 0 0001 1000 0010 | 396 | | | BRU | >15 | MINUS 2 INSTRU |
| 000A | 0 0000 0000 0101 | 397 | 399 | | OPRKEY | | |
| | | 398 | | | ORG | >5 | PLUS 65 INSTRU |
| 0005 | 0 0001 1111 0000 | 399 | | OPRKEY | CALL | | |
| 0102 | 0 0000 0101 1001 | 400 | 501 | | FNENRM | | |
| 00B1 | 0 0001 1001 1111 | 401 | | | BSSTO | | MEM OP ? |
| 0140 | 0 0001 1011 1010 | 402 | 422 | | MEMOP | | YES |
| 00A0 | 0 0001 1010 0111 | 403 | | | BSEN | | |
| 0050 | 0 0001 1101 0011 | 404 | 419 | | CHGUP | | |
| 012B | 0 0000 0101 0111 | 405 | | | BEN | | |
| 0094 | 0 0001 1000 1111 | 406 | | | BSPEND | | OP PENDING ? |
| 014A | 0 0000 0110 1011 | 407 | 319 | | OPRKY3 | | YES |
| 0045 | 0 0000 0101 0001 | 408 | | | SPEN | | NO |
| 0152 | 0 0000 1011 0001 | 409 | | OPRRTN | AKA | DPT,1 | |
| 01A9 | 0 0001 1010 1110 | 410 | | | BRCARRY | | |
| 0104 | 0 0000 0111 1010 | 411 | 414 | | OPRRT1 | | |
| 01EA | 0 0000 0110 0110 | 412 | | | CLRA | | |
| 00F5 | 0 0000 0011 0011 | 413 | | | AKAA | DPT,7 | |
| 007A | 0 0001 1001 1111 | 414 | | OPRRT1 | BSSTO | | |
| 0130 | 0 0001 1111 1111 | 415 | 4 | | MEMRTN | | |
| 009E | 0 0000 0110 0000 | 416 | | | STAB | | |
| 014F | 0 0001 1000 1110 | 417 | | | BRPEND | | |
| 01A7 | 0 0001 0001 1111 | 418 | 23 | | DISPLAY | | |
| 0103 | 0 0000 0101 0110 | 419 | | CHGUP | LOADOPS | | |
| 00F9 | 0 0001 1000 0010 | 420 | | | BRU | | |
| 0174 | 0 0000 1000 1111 | 421 | 24 | | POSTNM | | |
| 01BA | 0 0001 1000 1110 | 422 | | MEMOP | BRPEND | | |
| 0100 | 0 0000 0111 0011 | 423 | 425 | | MEMOP1 | | |
| 00EE | 0 0000 0111 0101 | 424 | | | STHD | | |
| 0077 | 0 0000 0110 0000 | 425 | | MEMOP1 | STAB | | |
| 0068 | 0 0000 0110 1011 | 426 | | | EXAM | | |
| 0010 | 0 0000 0110 1000 | 427 | | | EXAM | | |
| 000F | 0 0001 1110 0111 | 428 | | | BSKBUB | | |
| 0007 | 0 0001 1010 0110 | 429 | 323 | | SUBT | | |
| 0104 | 0 0001 1110 0010 | 430 | | | BRKMD | | |
| 0181 | 0 0000 1101 0011 | 431 | 324 | | ADD | | |
| 01CA | 0 0001 1111 0000 | 432 | | | CALL | | |
| 006D | 0 0001 0101 1000 | 433 | 354 | | MLDVSN | | |
| 0070 | 0 0001 1110 1010 | 434 | | | MRKDIV | | |
| 0135 | 0 0001 1101 0000 | 435 | 486 | | MULTP2 | | |
| 019F | 0 0001 1000 0010 | 436 | | | BRU | | |
| 01CE | 0 0000 0001 1011 | 437 | 369 | | DIVIDE | | |
| 00E7 | 0 0001 0000 0011 | 438 | | SQRT2 | LSA | | A = ARG, B = 1, C = ANS |
| 0173 | 0 0000 0110 1100 | 439 | | SQRT3 | EXCH | | A = ARG, B = ANS, C = 1 |
| 00A4 | 0 0001 0111 1100 | 440 | | SQRT4 | SAHA | MANT | ARG = ARG – ANS |
| 003C | 0 0001 1010 1110 | 441 | | | BRCARRY | | |
| 012F | 0 0001 1000 0100 | 442 | 472 | | SQRT6 | | |
| 0097 | 0 0000 0110 1000 | 443 | | | EXAH | | A = ANS, B = ARG, C = 1 |
| 0048 | 0 0000 0110 1100 | 444 | | | EXCH | | A = ANS, B = 1, C = ARG |
| 0125 | 0 0001 0111 0010 | 445 | | | AAHA | MANT | |
| 0192 | 0 0000 0110 1100 | 446 | | | EXCH | | |
| 01C9 | 0 0000 0110 1000 | 447 | | | EXAH | | |
| 01E8 | 0 0001 0111 1110 | 448 | | | SAB | MANT | |
| 00F2 | 0 0001 1010 1110 | 449 | | | BRCARRY | | |
| 0172 | 0 0000 1001 0001 | 450 | 467 | | SQRT5 | | |
| 00BC | 0 0001 0111 1010 | 451 | | | SABA | MANT | |
| 015F | 0 0001 1000 0010 | 452 | | | BRU | | |
| 014F | 0 0000 1011 1001 | 453 | 440 | | SQRT4 | | |
| 0107 | 0 0000 0110 1010 | 454 | | MLDVK5 | EXAC | | |
| 00EB | 0 0000 1010 1111 | 455 | | | AKA | DVF,15 | |
| 0175 | 0 0001 1010 1110 | 456 | | | BRCARRY | | |
| 00BA | 0 0001 0011 1011 | 457 | 194 | | ALGND4 | | |
| 0150 | 0 0001 0010 0011 | 458 | | | RSA | | |
| 00AF | 0 0000 0011 1111 | 459 | | | AKAA | DPT,15 | |
| 0057 | 0 0001 1010 1110 | 460 | | | BRCARRY | | |
| 002B | 0 0000 0000 1100 | 461 | 264 | | ERROR | | |
| 0115 | 0 0001 1000 0010 | 462 | | | BRU | | |

| | | | | | | |
|---|---|---|---|---|---|---|
| 0AA | 0 0001 0011 1011 | 463 | 194 | | ALGND4 | |
| | | 464 | | | ORG | >45  MULTIPLY 59 INSTRU |
| 045 | 0 0001 1000 0010 | 465 | | | HRU | |
| 122 | 0 0000 0000 0101 | 466 | 399 | | OPRKEY | |
| 091 | 0 0000 0110 1000 | 467 | | SQRT5 | EXAB | |
| 04A | 0 0000 0110 1100 | 468 | | | EXCH | |
| 024 | 0 0001 0111 1010 | 469 | | | SAHA | MANT |
| 012 | 0 0000 0110 1100 | 470 | | | EXCH | |
| 109 | 0 0000 0110 1000 | 471 | | | EXAB | |
| 1A0 | 0 0001 0111 0010 | 472 | | SQRT6 | AAHA | MANT |
| 0C2 | 0 0000 1010 1111 | 473 | | | AKA | OVF,15 |
| 061 | 0 0001 1010 1110 | 474 | | | HRCARRY | |
| 130 | 0 0001 1001 1110 | 475 | 67 | | SQR17 | |
| 196 | 0 0000 0110 1000 | 476 | | | FXAB | |
| 1CC | 0 0000 0011 1111 | 477 | | | AKAA | OPT,15 |
| 0E6 | 0 0001 0010 0011 | 478 | | | RSA | |
| 073 | 0 0000 0110 1000 | 479 | | | EXAB | |
| 030 | 0 0000 0110 1010 | 480 | | | EXAC | |
| 01C | 0 0001 0010 0011 | 481 | | | RSA | |
| 10F | 0 0001 1000 0010 | 482 | | | HRU | |
| 087 | 0 0001 1110 0111 | 483 | 69 | | SWRTA | |
| 143 | 0 0001 0111 0010 | 484 | | MULTP1 | AAHA | MANT | NO |
| 1A1 | 0 0000 0110 1010 | 485 | | MULTP | FXAC | | CLR C FOR ANS |
| 100 | 0 0000 0000 1111 | 486 | | MULTP2 | AKAA | LSD,15 | DECR LSD |
| 11E6 | 0 0000 0110 1010 | 487 | | | FXAC | | ANS TO A |
| 10F4 | 0 0001 1010 1111 | 488 | | | BSCARRY | | HAS LSD > 0 ? |
| 117A | 0 0001 0100 0011 | 489 | 484 | | MULTP1 | |
| 11A0 | 0 0000 0011 0010 | 490 | | MULTP3 | AKAA | OPT,2 | INCR COUNT |
| 100F | 0 0001 1010 1111 | 491 | | | HSCARRY | | FINISHED ? |
| 136 | 0 0001 0100 0010 | 492 | 205 | | MLOVEK | |
| 1187 | 0 0001 0010 0011 | 493 | | | RSA | | NO, SHIFT ANS |
| 100H | 0 0000 0110 1010 | 494 | | | FXAC | |
| 1060 | 0 0001 0010 0011 | 495 | | | RSA | | SHIFT 1ST OPR |
| 113H | 0 0001 1000 0010 | 496 | | | HRU | |
| 1134 | 0 0001 1101 0000 | 497 | 486 | | MULTP2 | |
| 10CA | 0 0001 0111 1010 | 498 | | ALGND9 | SAHA | MANT |
| 116A | 0 0001 1000 0010 | 499 | | | HRU | |
| 10H3 | 0 0001 1110 1001 | 500 | 294 | | ALGND8 | |
| 1059 | 0 0001 1000 0110 | 501 | | PRENAM | HRLE | |
| 102C | 0 0001 0100 0101 | 502 | 305 | | PRENM7 | |
| 101A | 0 0001 1001 0111 | 503 | | PRENM6 | HSLOCK | |
| 110H | 0 0000 1000 1011 | 504 | 304 | | PRENM4 | |
| 1145 | 0 0000 1010 1000 | 505 | | | AKA | OVF,8 |
| 11C2 | 0 0001 1010 1110 | 506 | | | HRCARRY | |
| 10H1 | 0 0001 1101 1100 | 507 | 510 | | PRENM3 | |
| 1170 | 0 0000 0101 0010 | 508 | | | SLHC | |
| 11HH | 0 0000 0010 1000 | 509 | | | AKAA | OVF,8 |
| 110C | 0 0000 1001 1111 | 510 | | PRENM3 | AKA | MSD,15 | MSD = 0 ? |
| 11EF | 0 0001 1010 1111 | 511 | | | HSCARRY | NO |
| 10F7 | 0 0001 1111 1101 | 512 | 297 | | PRENM2 | |
| 107A | 0 0001 0000 0011 | 513 | | PRENM1 | LSA | | YES |
| 1030 | 0 0001 0000 0011 | 514 | | | LSA | |
| 101F | 0 0001 0010 0011 | 515 | | | HSA | |
| 110F | 0 0000 0011 0001 | 516 | | | AKAA | OPT,1 | SHIFT LEFT, ADD-1 TO OPT |
| 1187 | 0 0000 1011 0001 | 517 | | | AKA | OPT,1 |
| 11C5 | 0 0001 1010 1110 | 518 | | | HRLCARRY | |
| 11F1 | 0 0001 1101 1100 | 519 | 510 | | PRENM3 | |
| 1F0 | 0 0000 0110 0110 | 520 | | PRENM8 | CLRA | | ZERO ARG |
| 01FH | 0 0000 0011 0111 | 521 | | | AKAA | OPT,7 |
| 01FC | 0 0001 1000 0010 | 522 | | | HRU | |
| 01FE | 0 0001 0001 0111 | 523 | 303 | | PRENM5 | |

What is claimed is:

1. An electronic data processing system comprising:
   (a) an instruction memory for storing a plurality of instruction words in sequential memory locations, said plurality of instruction words having at least one set of a branch instruction word followed by a branch address instruction word in the next sequential memory location, said branch address instruction word being solely indicative of one of said memory locations, said instruction memory further for outputting a particular instruction word upon reception of a memory address indicative of said memory location of said particular instruction word;
   (b) a program counter for storing therein a memory address solely indicative of a particular memory location of said instruction memory including means for applying said memory address to said instruction memory;
   (c) an instruction decoder logic means, responsive to instruction words outputted from said instruction memory, for decoding said instruction words, said decoder logic means including a branch instruction detection means for detecting when one of said instruction words is a branch instruction word; and
   (d) a branch logic system for setting said program counter to the address indicated by the instruction word stored in the sequential memory location immediately following the memory location wherein said detected branch instruction word is stored in response to the detection of said branch instruction word by said branch instruction detection means.

2. A data processing system according to claim 1 further comprising:
   at least one flag latch having a set state and a reset state; and wherein
   said instruction memory has stored therein at least one flag latch set instruction word and at least one flag latch reset instruction word corresponding to each of said at least one flag latches;

said instruction decoder means further includes a flag latch set means for setting said at least one flag latch upon decoding a corresponding flag latch set instruction word and a flag latch reset means for resetting said at least one flag latch upon decoding a corresponding flag latch reset instruction word;

said memory locations of said instruction memory each of said instruction words stored in said memory locations of said instruction memory, including said at least one branch instruction word and said at least one branch address instruction word, has said predetermined number of bits; said branch detecting means includes means for determining whether a said branch instruction word is a conditional or an unconditional branch instruction word, selected ones of said bits of said branch instruction word being indicative whether the branch is conditional or unconditional, and a said conditional branch instruction word corresponding to at least one flag latch, other selected ones of said bits of said conditional branch instruction word being indicative of, the corresponding flag latch upon which the branch is conditioned and the particular state of said corresponding flag latch upon which the branch is conditioned;

said branch instruction detection means further includes means responsive to said selected bits of said detected branch instruction word and responsive to the state of said at least one flag latch for enabling bits indicate said detected branch instruction word is detected branch instruction word is conditional and said corresponding flag latch is in said particular state.

3. A data processing system according to claim 1 wherein:

said memory locations of said instruction memory each have a predetermined number of bit storage locations, whereby each of said instruction words stored in said memory locations of said instruction memory, including said at least one branch instruction word and said at least one branch address instruction word, has said predetermined number of bits.

4. A method of performing branch operations in an electronic data processing system comprising the steps of:

(a) storing instruction words in sequential memory locations of an instruction memory including storing at least one branch instruction word and storing a correlated branch address instruction word, solely indicative of one of the memory locations, in the next sequential memory location following the memory location of said at least one branch instruction word;

(b) reading instruction words out of the instruction memory from a memory location indicated by the contents of a program counter;

(c) periodically changing the contents of the program counter to indicate the next sequential memory location in the instruction memory;

(d) determining whether a said instruction word read out of the instruction memory is a branch instruction word; and (e) changing the program counter to the indication of the memory location as found in the correlated branch address instruction word when it is determined that the instruction word read out of the instruction memory is determined to be a said branch instruction word.

5. The method according to claim 4 wherein the step of storing instruction words in an instruction memory further includes storing at least one flag latch set instruction word and storing at least one flag latch reset instruction word, said storing of said at least one branch instruction word includes storing either one unconditional branch instruction or a conditional branch, a selected portion of said branch instruction word being indicative that the branch is unconditional or conditional, another selected portion of said conditional branch instruction word being indicative of the branch is conditional and the particular state of an associated flag latch upon which the branch is conditioned, said method further comprising the steps of:

(a) setting a said flag latch when a flag latch set instruction word is read out of the instruction memory;

(b) resetting the said flag latch when a flag latch reset instruction word is read out of the instruction memory;

(c) determining whether a said branch instruction word read out of the instruction memory is an unconditional branch instruction word or a conditional branch instruction word and if a conditional branch instruction word whether the condition is satisfied, said step including the sub-steps of:

(i) testing said selected portion of the branch instruction word to determine if the branch is unconditional or conditional;

(ii) if the branch is conditional, testing the state of the associated flag latch; and (iii) comparing the actual state of the associated flag latch with the particular state of the associated flag latch upon which the branch is conditioned as indicated by said another selected portion to determine if the actual state of the flag latch satisfies the condition; and (d) enabling the step of changing of the program counter only if the branch instruction word is an unconditional branch instruction word or the branch instruction word is a conditional branch instruction word and the condition is satisfied.

6. A microprocessor branch system comprising:

(a) an instruction memory for storing a plurality of instruction words in sequential memory locations, including at least one set of a branch instruction word followed by a branch address instruction word, solely indicative of one of said sequential memory locations, in the next sequential memory location, said instruction memory further including means for outputting a particular instruction word upon reception of a memory address indicative of said memory location of said particular instruction word;

(b) an address register means for storing therein a said memory address indicative of a particular memory location of said instruction memory, for applying said memory address to said instruction memory, and for periodically altering said memory address stored therein to the memory address indicative of the next sequential memory location in said instruction memory;

(c) branch instruction detecting means responsive to instruction words outputted from said instruction memory for detecting when a branch instruction word is outputted; and (d) means responsive to said branch instruction detecting means for replacing the memory address stored in said address register means with said indication of one of said sequential memory locations as found in the next instruction word outputted from said instruction memory after said detection of said branch instruction word.

7. A microprocessor branch system according to claim 6, wherein:

said system further comprises at least one flag latch having a set state and a reset state the state of which sets a condition upon which a conditional branch is based;

said instruction words stored in said instruction memory further include at least one flag latch set instruction word and at least one flag latch reset instruction word;

said at least one branch instruction word includes at least one unconditional or conditional branch instruction word, a selected portion of said branch instruction word being indicative that the branch is unconditional or conditional, another selected portion of said conditional branch instruction word being indicative of the particular state of said flag latch upon which the branch is conditioned;

said system further comprises a flag latch set means responsive to instruction words outputted from said instruction memory for setting said flag latch when a flag latch set instruction word is outputted;

said system further comprises a flag latch reset means responsive to instruction words outputted from said instruction memory for resetting said flag latch when a flag latch reset instruction word is outputted, said system further comprising means for determining from said selected portion of said branch instruction word whether a detected branch instruction word is an unconditional branch instruction word or a conditional branch instruction word and, if it is a conditional branch instruction word, whether the condition is satisfied, said means including:

(i) means for testing said selected portion of said branch instruction word for determining whether the branch is unconditional or conditional;

(ii) means for testing the state of said flag latch if the branch is conditional; and (iii) means for comparing the tested state of said flag latch with the particular state of said flag latch upon which the branch is conditioned as indicated by said another selected portion of said branch instruction word for determining whether the actual state of said flag latch satisfies the condition; and said system further comprises an enabling means for enabling said replacing means only if said branch instruction word is an unconditional branch instruction word or said branch instruction word is a conditional branch instruction word and the condition is satisfied.

8. A microprocessor branch system according to claim 7 wherein:

said system further comprises at least one further flag latch having a set state and a reset state;

said instruction words stored in said instruction memory further include at least one further flag latch set instruction word and at least one further flag latch reset instruction word corresponding to each of said at least one further flag latch;

said at least one branch instruction word further including at least one further conditional branch instruction word corresponding to said at least one further flag latch, said selected portion of said at least one further conditional branch instruction word being indicative that the branch is conditional, said another selected portion of said at least further conditional branch instruction word being indicative of the corresponding further flag latch upon which the branch is conditioned and the particular state of said corresponding further flag latch upon which the branch is conditioned;

said system further comprises a further flag latch set means, corresponding to said at least one further flag latch, responsive to instruction words outputted from said instruction memory for setting said further flag latch when said corresponding further flag laltch set instruction word is outputted;

said system further comprises a further flag latch reset means, corresponding to said at least one further flag latch, responsive to instruction words outputted from said instruction memory for resetting said further flag latch when said corresponding further flag latch reset instruction word is outputted; and said determining means further includes means for testing the state of said at least one further flag latch and said means for comparing further comprises means for comparing the tested state of said corresponding further flag latch with the particular state of said corresponding further flag latch upon which the branch is conditioned as indicated by said another selected portion of said further conditional branch instruction word for determining whether the actual state of said corresponding further flag latch satisfies the condition.

* * * * *